United States Patent
Ogawa

(10) Patent No.: US 10,681,234 B2
(45) Date of Patent: Jun. 9, 2020

(54) IMAGE PROCESSING APPARATUS AND IMAGE PROCESSING METHOD

(71) Applicant: SHARP KABUSHIKI KAISHA, Sakai, Osaka (JP)

(72) Inventor: Kazuma Ogawa, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/178,337

(22) Filed: Nov. 1, 2018

(65) Prior Publication Data
US 2019/0132462 A1    May 2, 2019

(30) Foreign Application Priority Data
Nov. 2, 2017   (JP) .................................. 2017-212782

(51) Int. Cl.
H04N 1/00      (2006.01)
G06K 15/00     (2006.01)

(52) U.S. Cl.
CPC ..... H04N 1/00575 (2013.01); H04N 1/00702 (2013.01); H04N 1/00777 (2013.01)

(58) Field of Classification Search
None
See application file for complete search history.

(56) References Cited

U.S. PATENT DOCUMENTS

| | | | | |
|---|---|---|---|---|
| 2009/0257658 A1* | 10/2009 | Fukunaga | ............ | H04N 1/3873 382/199 |
| 2019/0124229 A1* | 4/2019 | Ishino | .................... | H04N 1/393 |
| 2019/0132471 A1* | 5/2019 | Fujita | ................... | H04N 1/2034 |

FOREIGN PATENT DOCUMENTS

| | | |
|---|---|---|
| CN | 101374190 A | 2/2009 |
| CN | 107040675 A | 8/2017 |
| JP | 2006-339770 A | 12/2006 |
| JP | 2016225870 A | * 12/2016 |

OTHER PUBLICATIONS

Machine Translation of JP 2016225870; "JP2016225870_machine_translation_03_20_2020.pdf"; Author Kevin Thampton; Title Image Reader and Image Forming Apparatus; Date (Dec. 28, 2016); Publisher Kyocera Document Solutions Inc; pp. 1-23 (Year: 2016).*

* cited by examiner

*Primary Examiner* — Dov Popovici
(74) *Attorney, Agent, or Firm* — ScienBiziP, P.C.

(57) ABSTRACT

An image processing apparatus includes a platen on which a document to be read is placed, an image input unit configured to read, at a time, one or a plurality of documents placed on the platen, an individual image extraction unit configured to extract individual images of the one or the plurality of documents read at a time, an individual image location judgment unit configured to determine whether the extracted individual images are each located within one of areas set in a reading area of the platen depending on the number of documents to be read, and an individual image selection unit configured to, in a case where one or a plurality of the extracted individual images are located within a particular area, select one individual image as an image to be captured in the area based on a predetermined selection criterion.

9 Claims, 21 Drawing Sheets

FIG. 4A
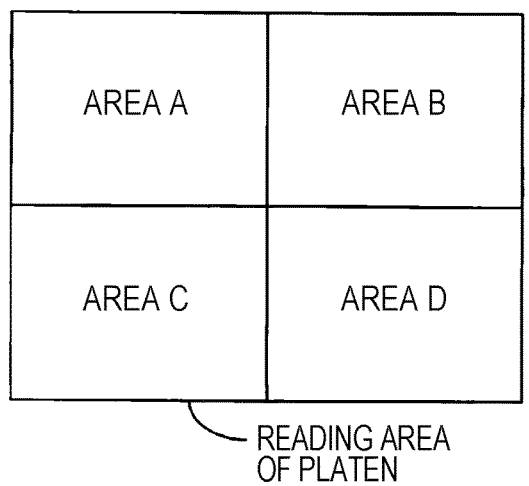
FIG. 4B
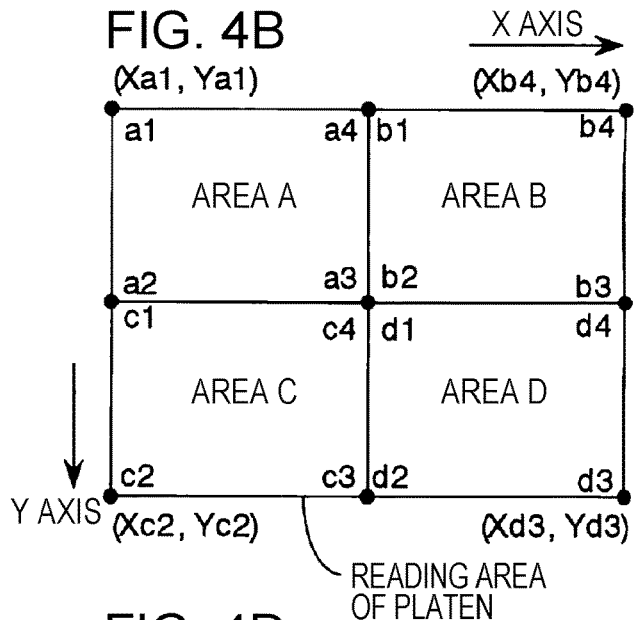
FIG. 4C
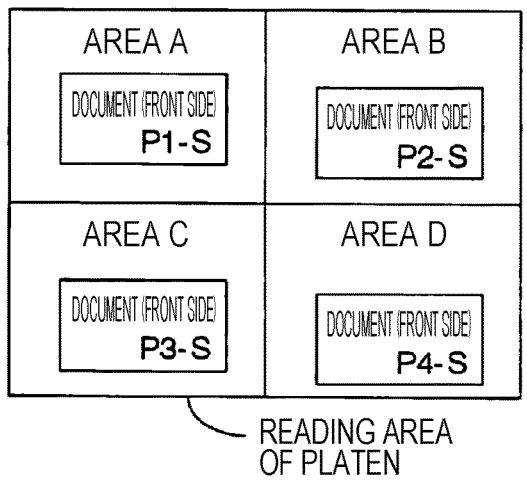
FIG. 4D
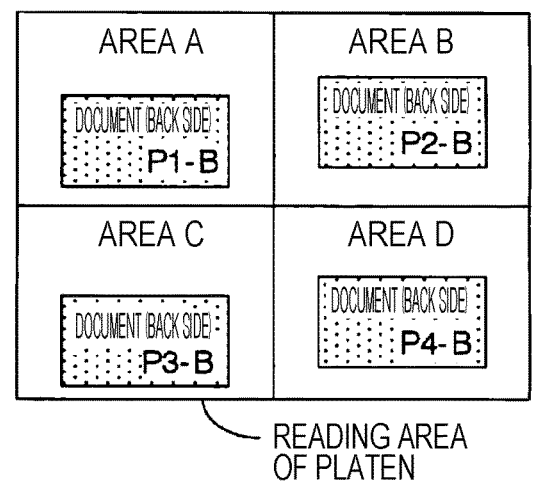
FIG. 4E   FIG. 4F   FIG. 4G   FIG. 4H
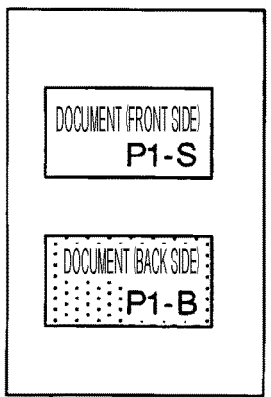 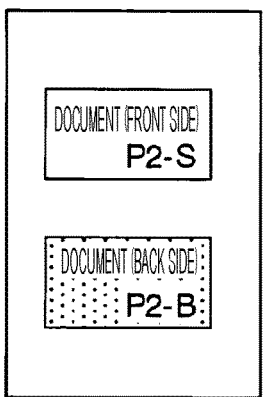 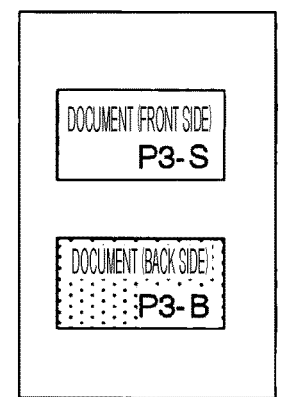 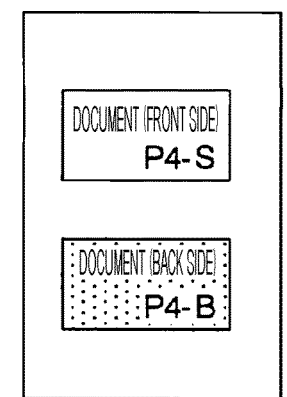

FIG. 8A

| NUMBER OF AREAS | 1 |
|---|---|

FIG. 8B

| NUMBER | DESCRIPTION OF OUTPUT MODE |
|---|---|
| 1 | IMAGES OF FRONT SIDE AND BACK SIDE ARE COMBINED INTO ONE IMAGE |
| 2 | IMAGES OF FRONT SIDE AND BACK SIDE ARE OUTPUT SEPARATELY |
| 3 | ALL IMAGES ARE COMBINED TOGETHER AND OUTPUT ON SAME PAPER |
| 4 | INPUT IMAGES ARE OUTPUT INDIVIDUALLY |

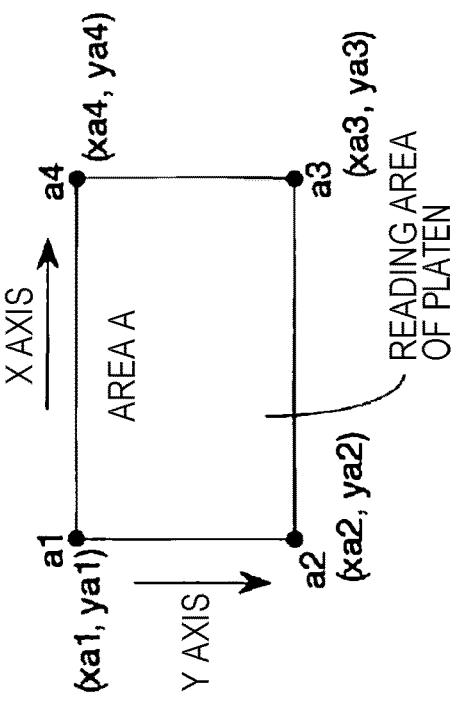

| AREA NUMBER | AREA VERTEX LOCATION COORDINATES | | | |
|---|---|---|---|---|
| | a1 | a2 | a3 | a4 |
| A | (xa1, ya1) | (xa2, ya2) | (xa3, ya3) | (xa4, ya4) |

| READING SEQUENCE NUMBER | INPUT IMAGE NUMBER | DOCUMENT VERTEX LOCATION COORDINATES | | | | HORIZONTAL LENGTH | VERTICAL LENGTH | AREA NUMBER | IMAGE DATA | DOCUMENT IDENTIFICATION NUMBER |
|---|---|---|---|---|---|---|---|---|---|---|
| SC01 (FIRST TIME READING) | N01 | P1 (x1, y1) | P2 (x2, y2) | P3 (x3, y3) | P4 (x4, y4) | L1 | L2 | A | IMG001 | G01 |
| SC02 (SECOND TIME READING) | N02 | P6 (x6, y6) | P7 (x7, y7) | P8 (x8, y8) | P9 (x9, y9) | L1 | L2 | A | IMG002 | G01 |

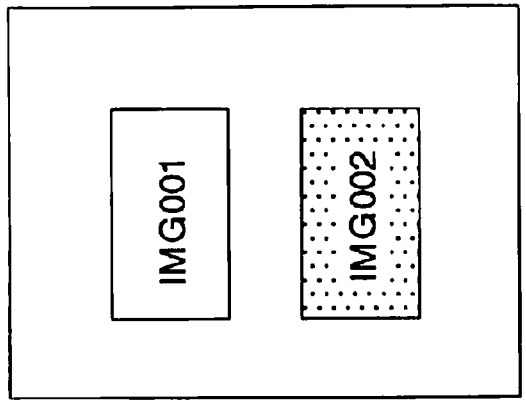

FIG. 9A
| NUMBER OF AREAS | 2 |
|---|---|
FIG. 9B
| LONGITUDINAL LENGTH L0 | LATERAL LENGTH S0 |
|---|---|
| 80 mm | 40 mm |
FIG. 9C
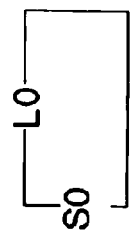
FIG. 9D
| AREA NUMBER | AREA VERTEX LOCATION COORDINATES | | | |
|---|---|---|---|---|
| A | a1 (xa1, ya1) | a2 (xa2, ya2) | a3 (xa3, ya3) | a4 (xa4, ya4) |
| B | b1 (xb1, yb1) | b2 (xb2, yb2) | b3 (xb3, yb3) | b4 (xb4, yb4) |
a4 (xa4, ya4) = b1 (xb1, yb1)   xa1=xa2, xa3=xa4=xb1=xb2, xb3=xb4
a3 (xb3, yb3) = b2 (xb2, yb2)   ya1=ya4=yb1=yb4, ya2=ya3=yb2=yb3
FIG. 9E
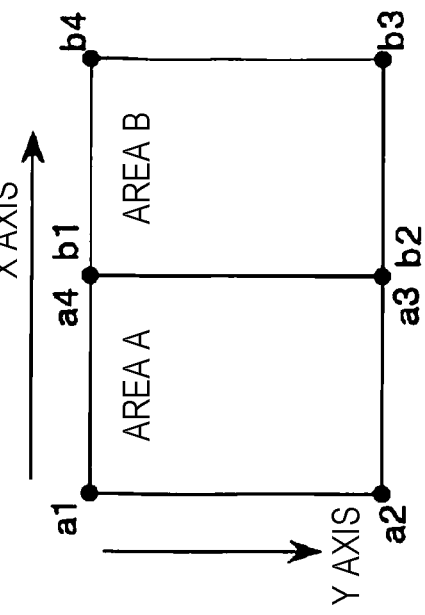

FIG. 9F

| READING SEQUENCE NUMBER | INPUT IMAGE NUMBER | DOCUMENT VERTEX LOCATION COORDINATES | HORIZONTAL LENGTH | VERTICAL LENGTH | AREA NUMBER | IMAGE DATA | DOCUMENT IDENTIFICATION NUMBER |
|---|---|---|---|---|---|---|---|
| SC01 (FIRST TIME READING) | N01 | P1 P2 P3 P4<br>(x1, y1) (x2, y2) (x3, y3) (x4, y4) | L1 | L2 | A | IMG011 | G01 |
| SC01 (FIRST TIME READING) | N02 | P6 P7 P8 P9<br>(x6, y6) (x7, y7) (x8, y8) (x9, y9) | L6 | L7 | B | IMG012 | G02 |
| SC02 (SECOND TIME READING) | N03 | P11 P12 P13 P14<br>(x11, y11) (x12, y12) (x13, y13) (x14, y14) | L1 | L2 | A | IMG021 | G01 |
| SC02 (SECOND TIME READING) | N04 | P16 P17 P18 P19<br>(x16, y16) (x17, y17) (x18, y18) (x19, y19) | L6 | L7 | B | IMG022 | G02 |

FIG. 9G
| INPUT IMAGE NUMBER | DOCUMENT IDENTIFICATION NUMBER | IMAGE DATA |
|---|---|---|
| N01 | G01 | IMG011 |
| N03 | G01 | IMG021 |
| N02 | G02 | IMG012 |
| N04 | G02 | IMG022 |
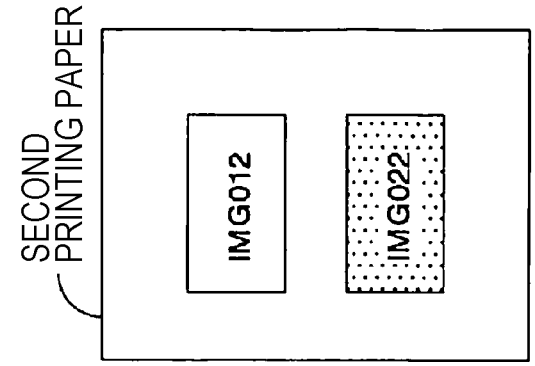
FIG. 9H
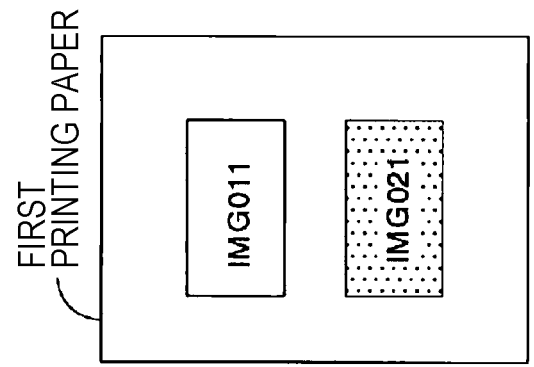
FIG. 9I

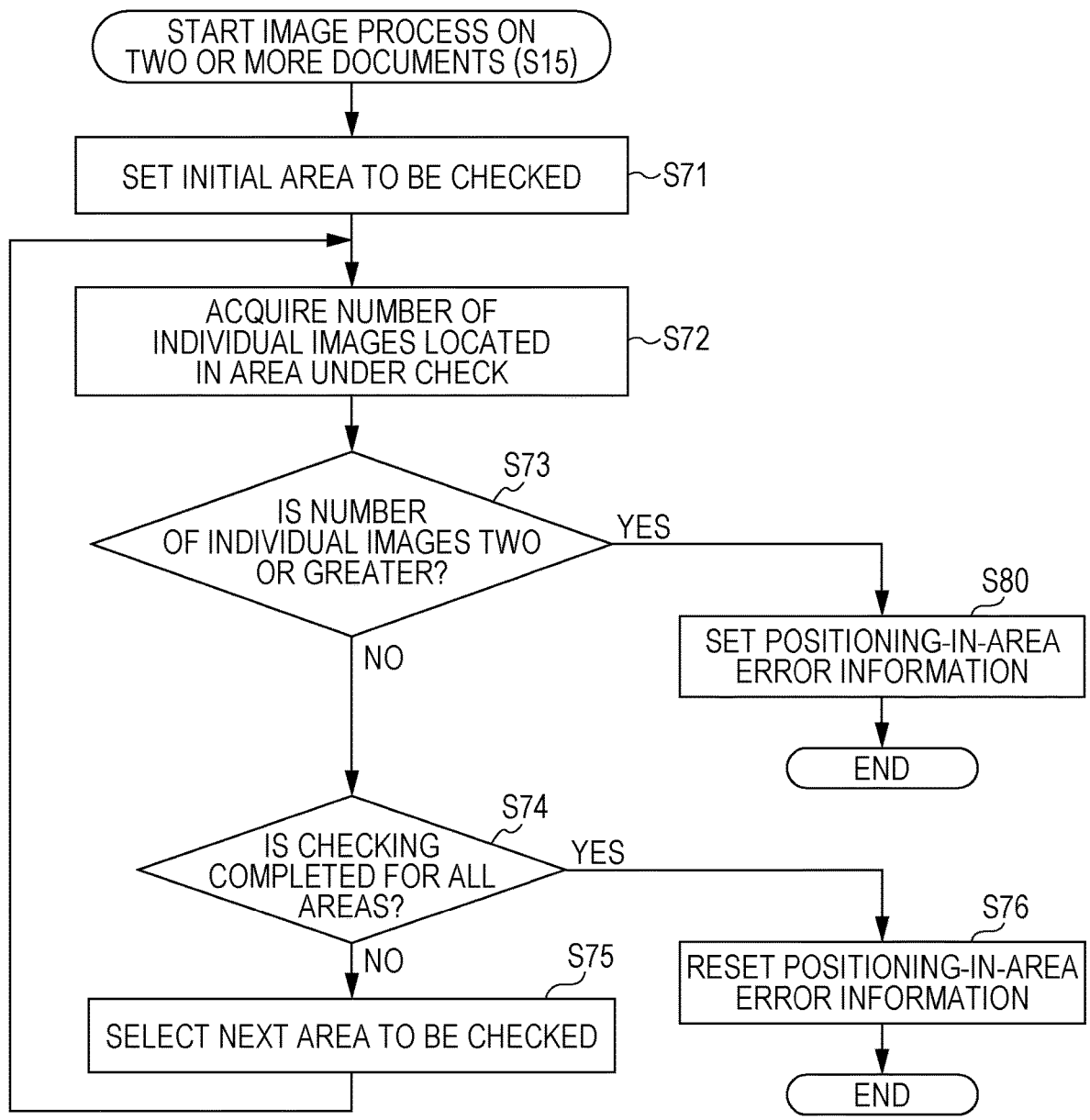

IMAGE PROCESSING APPARATUS AND IMAGE PROCESSING METHOD

BACKGROUND

1. Field

The present disclosure relates to an image processing apparatus and an image processing method, and more particularly, to an image processing apparatus capable of reading a plurality of documents at a time, and extracting image data of each document from the read image data and an image processing method therefor.

2. Description of the Related Art

Image forming apparatuses have been widely used. In recent years, multifunction apparatuses have been used. A typical multifunction apparatus has, in addition to a document copying function, a function of reading (scanning) a document, a network-connection function, and/or the like. For example, some multifunction apparatuses also provide a following function. That is, a plurality of originals such as paper whose front and back sides are printed, a business card, a license, and/or other documents or cards whose front and back sides are printed with images or the like are placed on a platen such that they do not overlap with each other. A read function is then executed on them to obtain whole image data including image data of each of all documents, and a plurality of pieces of image data corresponding to the individual documents are extracted from the read whole image data. Hereinafter, this function will be referred to as a multi-crop scan function.

Japanese Unexamined Patent Application Publication No. 2006-339770 discloses an image processing system in which the multi-crop scan function is used such that a plurality of documents placed on a platen are read (scanned) at a time, and image data of each document is extracted. The reading (scanning) is performed twice to acquire image data of front sides of the documents and image data of back sides of the documents. Front-side image data and corresponding back-side image data are associated to each other based on position information indicating locations of front sides and back sides of the respective documents (for example, coordinates of the center of image data calculated from extracted edges of the documents), and two pieces of image data associated to each other are combined.

However, in some conventional apparatuses, the multi-crop scan function works only for one document. Even in apparatuses that allow it to scan a plurality of documents at a time, there is a restriction on the document size, and/or there is a restriction on positions where documents are placed (for example, documents are allowed to be placed only at specific fixed positions). In a case where a plurality of documents are placed on a platen such that partial overlapping occurs or some documents are placed too close to each other, there is a possibility that an error occurs in extracting image data of each document.

Furthermore, in the image processing system disclosed in Japanese Unexamined Patent Application Publication No. 2006-339770, in a case where sizes are different among a plurality of documents or in a case where there is a difference in document placement position between first-time reading and second-time reading, and thus a position in the second-time reading partially overlaps with a position where another document was placed in the first-time reading, there is a possibility that an error occurs in associating a front side and a corresponding back side. When an error occurs in associating a front side and a corresponding back side, a user issues an instruction to correct the association or the user re-executes the reading process starting with placing the documents. In any case, such a re-operation may cause a large operation load to be imposed on the user.

In view of the above, the present disclosure provides an image processing apparatus capable of handling a document reading process such that when reading is performed on one or more documents on both sided of which images or the like are printed, image data of a front side of a document and image data of a back side of the same document are correctly associated to each other for each of one or more documents. Thus, it is allowed to easily acquire image data of both sides of a document, and thus a reduction in operation load imposed on a user is achieved.

SUMMARY

According to an aspect, the present disclosure provides an image processing apparatus including a platen on which a document to be read is placed, an image input unit configured to read, at a time, one or a plurality of documents placed on the platen, an individual image extraction unit configured to extract individual images of the one or the plurality of documents read at a time, an individual image location judgment unit configured to determine whether the extracted individual images are each located within one of areas set in a reading area of the platen depending on the number of documents to be read, and an individual image selection unit configured to, in a case where one or a plurality of the extracted individual images are located within a particular area, select one individual image as an image to be captured in the area based on a predetermined selection criterion.

According to an aspect, the present disclosure provides an image processing method for an image processing apparatus, including, to read a particular first side of a plurality of reading sides of each document of a plurality of documents, placing the plurality of documents on a platen such that one document is located within one of areas set in a reading area of the platen without overlapping between documents, and then performing a first-time reading process to read image data including the first side of each of the plurality of documents, thereafter, re-placing the plurality of documents such that each document is turned over and placed in the same area as the area in which the document is located when the first side of the document is read, and then performing a second-time reading process to read image data including the second side of each document different from the first side, extracting individual images of the first sides of the respective documents from the image data obtained in the first-time reading process, extracting individual images of the second sides of the respective documents from the image data obtained in the second-time reading process, determining whether each extracted individual image of the first side and each extracted individual image of the second side are located within one of areas set in the reading area of the platen, in a case where one or a plurality of extracted individual images are located within a particular area, selecting, as an image to be captured in the area, one individual image of the first side corresponding to one document and one individual image of the second side corresponding to the same document based on a predetermined selection criterion, and associating the individual image of the first side and the individual image of the second side of the document selected in the one area thereby obtaining image information of a front side and a back side of the one document, and outputting the image information of the front side and the back side associated with each other of the document for each of the plurality of read documents.

BRIEF DESCRIPTION OF THE DRAWINGS

FIGS. 4A to 4H are diagrams illustrating examples of manners of placing documents in a reading area for a case in which a front side and a back side of each of a plurality of documents are read by an image processing apparatus according to an embodiment of the present disclosure;

FIGS. 8A to 8G illustrates examples of various pieces of information used in an image processing apparatus according to an embodiment of the present disclosure;

FIGS. 9A to 9I illustrates examples of various pieces of information used in an image processing apparatus according to an embodiment of the present disclosure;

FIG. 17 is a flow chart illustrating an example of an image processing performed according to an embodiment for a case where two or more individual images are included in one same area.

DESCRIPTION OF THE EMBODIMENTS

Embodiments of the present disclosure are described below with reference to drawings. Note that the embodiments described below are merely examples, and the present disclosure is not limited to those embodiments.

Configuration of Image Processing Apparatus

Figure 1:
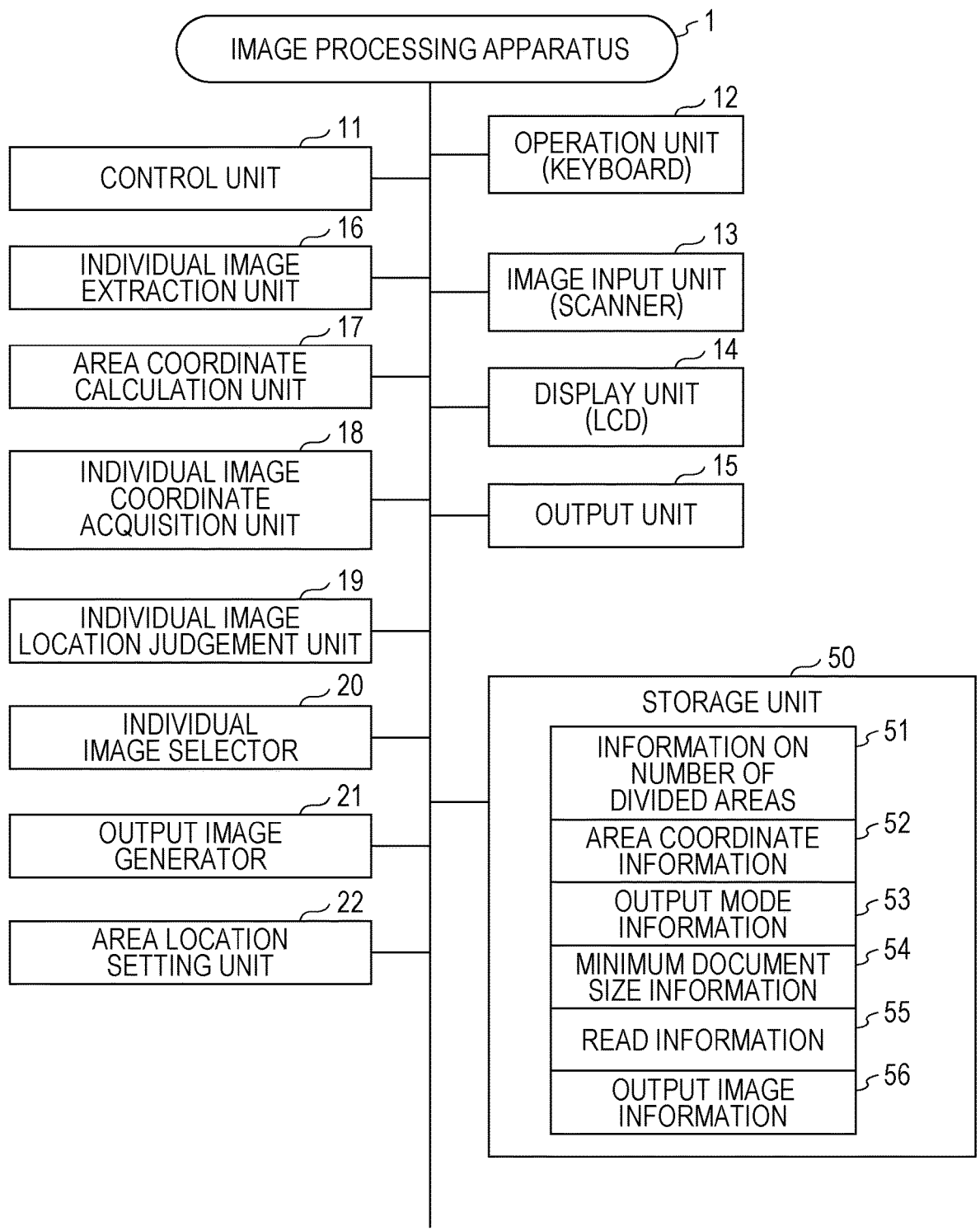
FIG. 1 is a block diagram illustrating a configuration of an image processing apparatus according to an embodiment of the present disclosure.

FIG. 1 is a block diagram illustrating a configuration of an image processing apparatus according to an embodiment of the present disclosure.

The image processing apparatus (hereinafter also referred to as an MFP (Multifunction Peripheral)) is an apparatus configured to process image data. For example, the image processing apparatus is an electronic device having a copy function, a print function, a document read function (scan function), a facsimile function, communication function, and/or the like. In particular, in the present disclosure, the image processing apparatus executes predetermined image processing using the document read function. To execute the document read function, the image processing apparatus includes a platen on which one or more documents to be read are placed. After the one or more documents are placed on the platen such that the documents are located within a reading area of the platen, if a user performs an operation to issue a read start instruction, information described on one of sides of each document is read as an image. It is assumed that the reading area of the platen has a shape of a rectangle.

In FIG. 1, the image processing apparatus (MFP) 1 according to the present disclosure includes mainly a control unit 11, an operation unit 12, an image input unit 13, a display unit. 14, an output unit 15, an individual image extraction unit 16, an area coordinate calculation unit 17, an individual image coordinate acquisition unit 18, an individual image location judgment unit 19, an individual image selection unit 20, an output image generation unit 21, an area location setting unit 22, and a storage unit 50.

The control unit 11 is a unit that controls an operation of each constituent element such as the image input unit. The control unit 11 is realized by a microcomputer mainly including a CPU, a ROM, a RAM, an I/O controller, a timer, and/or the like. The CPU executes an image input function, an output image generation function or the like according to the present disclosure by operating various kinds of hardware in a coordinated fashion based on a control program stored in advance in the ROM or the like.

The operation unit 12 is a unit used in inputting information such as characters or used in selecting a function. For example, a keyboard, a mouse, a touch panel, or the like is used as the operation unit 12.

The image input unit 13 is a unit that inputs image information. In the present disclosure, the image input unit 13 is configured to read a plurality of documents placed on a platen at a time. For example, the image input unit 13 inputs information of a document on which an image, a character, a graphical image, or the like are described. The input information is stored as electronic data in the storage unit 50. As for the image input unit 13, a scanner (a reading apparatus), configured to read a document on which information is printed (hereinafter referred to simply as a document), is used. Image information may be input by various methods. For example, a document on which information is printed is read by the scanner, and electronic data of the whole reading area of the platen including the document is stored, as input whole image data, in the storage unit 50.

However, the method of inputting information such as image information is not limited to the example described above. Alternatively, for example, an interface via which an external storage medium such as a USB memory is connected to the image processing apparatus 1 may be used as the image input unit 13, and information may be input from the external storage medium, for example, as follows. An electronic data file including image data, document data, or the like to be input is stored in an external storage medium such as a USB memory or the like. The USB memory or the like is connected to the input interface such as a USB connection port. A predetermined inputting operation is performed on the operation unit 12 to read a desired electronic data file from the USB memory or the like, and the read electronic data file is stored, as electronic data, in the storage unit 50.

In general, in a case where a document is read using the scanner, a user places the document on a platen (also referred to as a document placing plate), and performs an operation to issue a read start instruction. When the reading is started, generally, the whole reading area (a reading plane) of the platen is read as one piece of electronic data. In a case where the document size is smaller than the reading area of the platen, the read electronic data (the whole image data) includes an image of the document and also information of an area where no document exists. In the present disclosure, as will be described in further detail later, the individual image extraction unit 16 extracts image data (an individual image) of an area including the document from the one piece of read electronic data (the whole image data).

The reading area of the platen generally has a size corresponding to A4-size paper or A3-size paper. Therefore, when a plurality of documents are given, if their sizes are smaller than the reading area of the platen as is the case with business cards, postcard, photographic pictures, insurances, credit cards, or the like, it is possible to place a plurality of such documents on the platen such that no overlap occurs. However, even in a case where a plurality of documents placed on the platen are read by the scanner, the resultant read information is generated and stored as one piece of electronic data (the whole image data) as described above. In this case, the whole image data includes image data of the plurality of documents (individual images), and a plurality of pieces of image data of the respective documents (the individual images) are extracted from the read whole image data.

In the present disclosure, the number of individual areas (areas) and the locations thereof, where individual images are to be read, are automatically set depending on the number of documents that a user wants to read, and the plurality of pieces of image data of documents (individual images) included in the read whole image data are each extracted. The reading process is performed twice, and two pieces of image data extracted from the same area are associated together as front-side data and back-side data. For example, an image of a front side and an image of a back side of one document may be combined into a single piece of image information and may be printed on one sheet.

The display unit 14 is a unit configured to display information. Information used in executing various functions, a result of execution of a function, and/or the like are displayed to notify a user of the information. For example, an LCD, an organic EL display or the like may be used as the display unit 14. In a case where a touch panel is used as the operation unit 12, the display unit and the touch panel are disposed in an overlaid fashion.

The output unit 15 is a unit configured to output image information generated from an individual image. For example, the output unit 15 may be a printer that outputs image information by printing the image information on a paper medium. The output unit 15 is capable of outputting image information obtained by combining individual images corresponding to a first-side individual image and a second-side individual image associated together as image information of a front side and a back side of one document. For example, as will be described in further detail later, individual images of a front side and a back side of one read document are combined together and printed on one sheet of paper. Note that the method of outputting information is not limited to printing. Alternatively, information may be output by storing the information in an external storage medium such as a USB memory, or transmitting the information to another information processing apparatus or a server via a network such as the Internet.

The individual image extraction unit 16 is a unit configured to extract one or more individual images of one or more documents read at a time. That is, partial image data corresponding to a document is extracted from the whole image data input via the image input unit 13. That is, partial image data corresponding to a document is referred to as an individual image. In a case where one document is read, image data corresponding to an area where the one document is located is extracted from the input whole image data.

In a case where a plurality of documents placed on the platen are read at a time, the input whole image data includes image data corresponding to the respective documents, and thus image data corresponding to an area where each document is located is extracted. For example, in a case where four documents are placed on the platen and read at a time, four pieces of image data corresponding to the respective four documents are extracted. The function of extracting individual images by the individual image extraction unit 16 corresponds to a multi-crop scan function, and a known technique may be used for this purpose.

The area coordinate calculation unit 17 is a unit configured to calculate coordinate values to define a location of an individual area (an area) from which an individual image is to be extracted. In the present disclosure, basically, areas, in each of which one document to be read is placed, are set in advance in the whole reading area of the platen, depending on the number of documents to be read. The above-described areas set in the reading area of the platen depending on the number of documents to be read, that is, areas in each of which one document to be read is placed will be referred to as an individual area (also referred to as an area or a divided area). In a case where the reading area of the platen has a rectangular shape, and each individual area also has a rectangular shape, the location of each individual area is defined by coordinate values of four vertices of the rectangle.

It is assumed that the number of documents to be read is basically the same as the number of divided areas. For example, in a case where the number of documents to be read is one, the number of divided areas is set to 1. In this case, the whole reading area of the platen is set as an area where the one document is to be read. In a case where the number of documents to be read is 2, the number of divided areas is set to 2. In this case, the whole reading area of the platen is divided into two areas, for example, as described later with reference to FIGS. 3A to 3F, and each divided area (an area A and area B) is set as an area where a document placed there is read. In a case where the number of documents to be read is 4, the number of divided areas is set to 4. In this case, the whole reading area of the platen is divided into four areas, for example, as described later with reference to FIGS. 4A to 4H, and each divided area (an area A, an area B, an area C, and an area D) is set as an area where a document placed there is read.

The locations of the respective divided areas are set such that rectangular areas at fixed locations are defined in advance depending on the number of divided areas, and coordinates of four vertices of each rectangular area (area vertex location coordinates) indicating the location of each divided area are calculated and stored as area coordinate information in the storage unit 50 as described in further detail later. Note that the coordinates of four vertices of each divided area (area vertex location coordinates) are represented in relative coordinates with respect to the reading area of the platen.

For example, in a case where an X-axis is defined in a longitudinal direction of the reading area of the platen and a Y-axis is defined in a lateral direction of the reading area, the coordinates of four vertices of each divided area (area vertex location coordinates) may be represented by X-coordinates and Y-coordinates in the XY coordinate system.

Figure 2A:
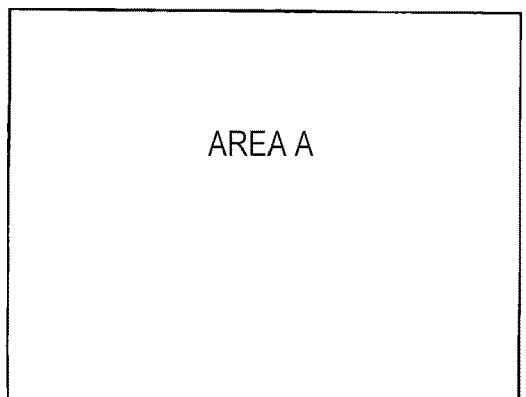
FIGS. 2A to 2F are diagrams illustrating examples of manners of placing a document in a reading area for a case where a front side and a back side of the document are to be read by an image processing apparatus according to an embodiment of the present disclosure.

FIGS. 2A to 2F are diagrams illustrating examples of manners of placing a document in a reading area for a case where a front side and a back side of the document are to be read. In a case where reading is performed on one document, only one reading area is set. FIG. 2A illustrates a case where only one reading area is set such that the whole reading area of the platen is employed as the one reading area (herein, referred to as an area A).

Figure 2B:
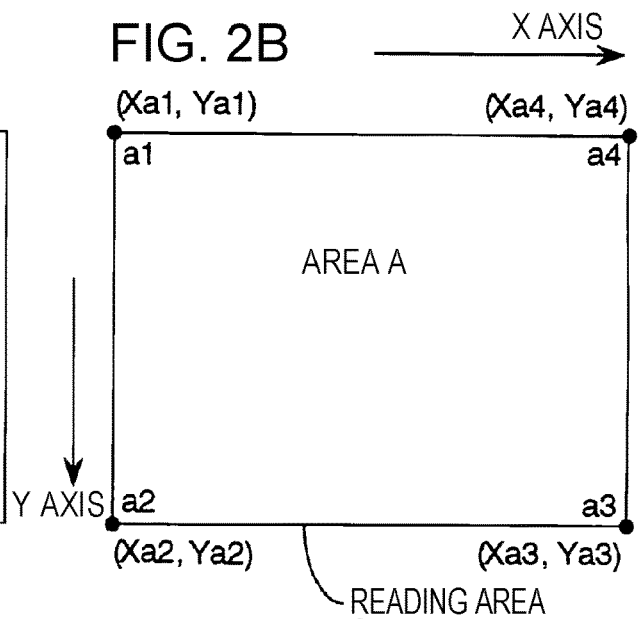

FIG. 2B illustrates an example of a manner in which XY-coordinate values are defined for four vertices of the area A. The reading area of the platen has a rectangular shape, in which the origin of the XY-coordinate system is defined at a vertex a1 of the rectangle, and the X-axis is defined in the longitudinal direction of the rectangle and the Y-axis is defined in the lateral direction of the rectangle as shown in FIG. 2B. In this case, the positions of four vertices (a1, a2, a3, and a4) of the rectangle corresponding to the reading area of the platen are represented by XY-coordinate values as illustrated in FIG. 2B. The area A is coincident with the whole reading area of the platen, and thus the XY-coordinates of the positions of the four vertices defining the area A (area vertex location coordinates) are given by the XY-coordinates of the positions of the four vertices (a1, a2, a3, and a4) defining the reading area of the platen and stored as area coordinate information as be described later with reference to FIGS. 8C and 8D.

Figure 3A:
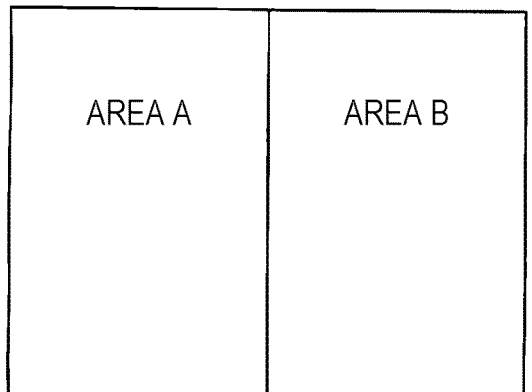
FIGS. 3A to 3F are diagrams illustrating examples of manners of placing documents in a reading area for a case in which a front side and a back side of each of a plurality of documents are read by an image processing apparatus according to an embodiment of the present disclosure.

FIGS. 3A to 3F are diagrams illustrating examples of manners of placing documents in reading areas for a case in which a front side and a back side of each of two documents are read according to an embodiment. In a case where reading is performed for two documents, two divided areas are set as areas where respective individual images are to be read. FIG. 3A illustrates an example in which two reading areas are set such that the reading area of the platen are horizontally divided into two areas (in this example, the two divided areas are respectively referred to as an area A and an area B). Note that the dividing direction is not limited to the horizontal direction. For example, the reading area of the platen may be vertically divided into two areas. The two divided areas may have the same or different shapes and/or area sizes.

Figure 3B:
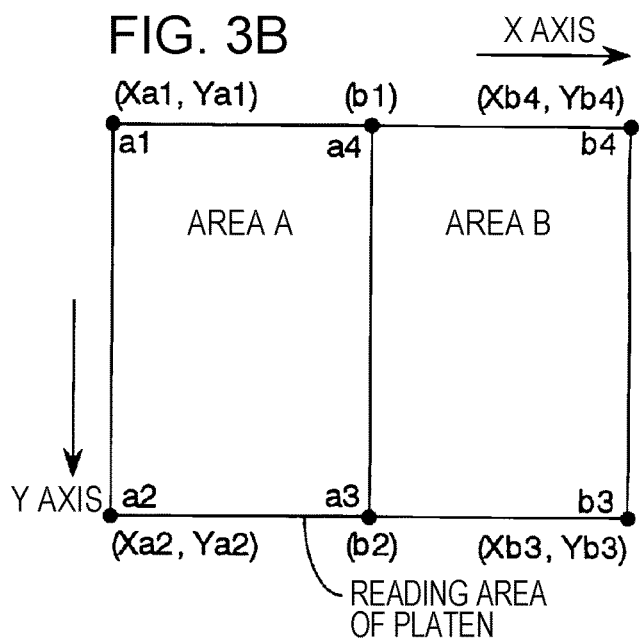

FIG. 3B illustrates a manner of defining XY-coordinate values of four vertices of each of the two divided areas (the area A and the area B) according to an embodiment. The X-axis and the Y-axis are defined in a similar manner as in FIG. 2B. A vertex a4 of the area A and a vertex b1 of the area B are represented by the same coordinates, and a vertex a3 of the area A and a vertex b2 of the area B are represented by the same coordinates. The XY-coordinates of four vertices of the two areas (area vertex location coordinates) are stored as area coordinate information as will be described later with reference to FIGS. 9D and 9E.

FIGS. 4A to 4H are diagrams illustrating examples of manners of placing documents in the reading area for a case in which a front side and a back side of each of four documents are read according to an embodiment. In a case where reading is performed for four documents, four divided areas are set as areas where respective individual images are to be read. FIG. 4A illustrates an example of a manner of dividing the reading area of the platen horizontally into two areas and vertically into two areas and thus into a total of four divided areas (an area A, an area B, an area C, and an area D). Note that the dividing manner is not limited to that shown in FIG. 4A. For example, the reading area of the platen may be divided only vertically into four area. The four divided areas may have the same or different shapes and/or area sizes.

FIG. 4B illustrates a manner of defining locations of four vertices of each of the four divided areas (the area A, the area B, the area C, and the area D) according to an embodiment. The X-axis and the Y-axis are defined in a similar manner as in FIG. 2B. Some of the vertices of the four areas have the same coordinate values. The locations and the sizes of the respective areas are set in advance basically to fixed values, for example, as illustrated in FIG. 4B. However, the locations and the sizes of the respective areas may be arbitrarily set or changed by a user.

However, in a case where the locations and the sizes of the respective areas are fixed depending on the number of set individual areas (areas), instead of calculating coordinate values of each area each time reading is performed, coordinate values of each area (area vertex location coordinates) may be determined depending on the number of areas and stored in advance in the storage unit 50. The area vertex location coordinates calculated by the area coordinate calculation unit 17 are used in performing a judgment (a positioning-in-area judgment) on whether each extracted individual image is located within one of set individual areas (areas).

The individual image coordinate acquisition unit 18 is a unit configured to acquire coordinate values indicating a location of each extracted individual image. The coordinate values indicating a location of each extracted individual image are coordinates defining a location of a document placed within a divided area, and the coordinates are referred to as document vertex position coordinates. The document vertex position coordinates include X-coordinates and Y-coordinates in an XY-coordinate system defined in the reading area of the platen. In a case where a document has a rectangular shape, the document vertex position coordinates include XY-coordinate values of four vertices of the rectangle. In the case where a document has a rectangular shape, the horizontal length and the vertical length of the document may be calculated from the XY-coordinate values of the four vertices. The horizontal length is a horizontal length of a rectangle determined from XY-coordinate values of four vertices of a rectangle, and more specifically, the horizontal length is a length as measured in a longitudinal direction of the reading area of the platen. The vertical length is a vertical length of the rectangle determined from XY-coordinate values of four vertices of the rectangle, and more specifically, the vertical length is a length as measured in a lateral direction of the reading area of the platen.

Figure 2C:
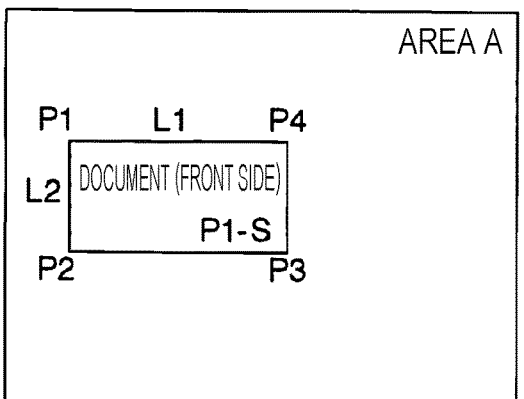
Figure 2D:
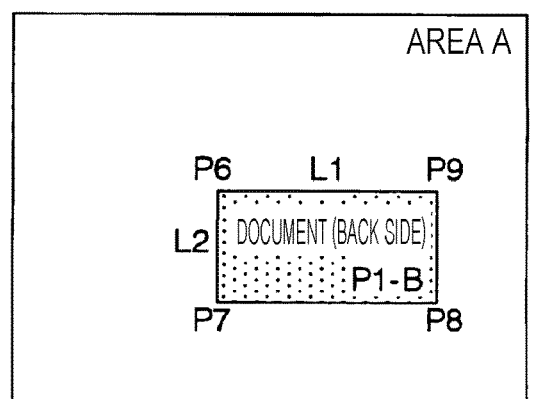
Figure 2E:
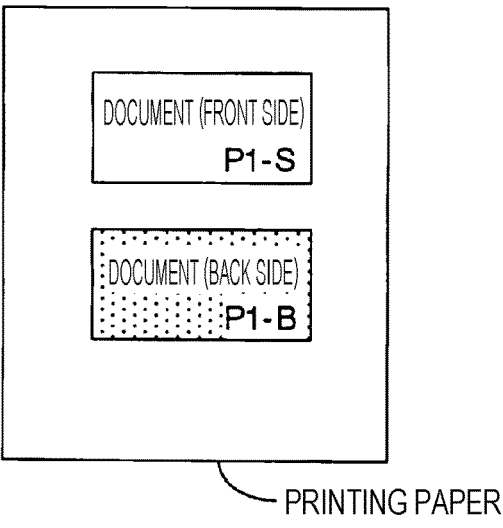
Figure 2F:
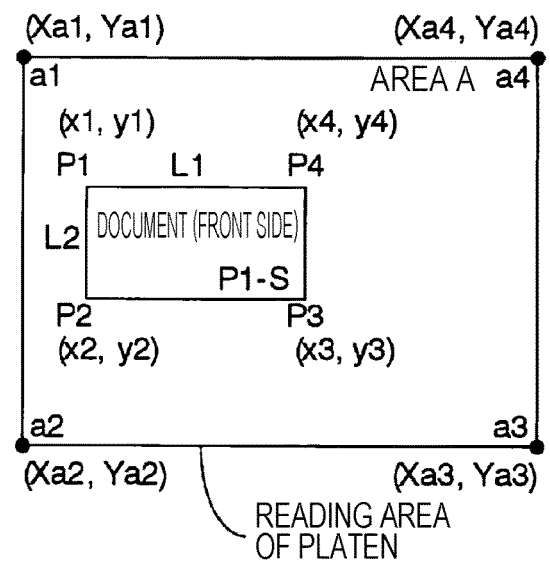

FIG. 2F illustrates an example of a manner of placing one document in the reading area of the platen while coordinates defining the reading area of the platen and coordinates defining the location of the document are shown. In FIG. 2F, the document is denoted by a rectangle defined by four vertices (P1, P2, P3, and P4). The position coordinates of the four vertices (P1, P2, P3, and P4) (the document vertex position coordinates) are represented by XY-coordinate values in the same XY-coordinate system as the XY-coordinate system in which XY-coordinate values of the reading area of the platen are represented. In FIG. 2F, the horizontal length L1 and the vertical length L2 of the document are also shown. The acquired document vertex position coordinates of the document and the horizontal length L1 and the vertical length L2 of the document are stored as part of read information as described later with reference to FIG. 8E.

The document vertex position coordinates acquired by the individual image coordinate acquisition unit 18 are also used in the positioning-in-area judgment on the extracted individual image. The horizontal length and the vertical length of the document are used, as described in further detail later, when sizes of documents are compared with the minimum document size information, and one individual image is selected from a plurality of individual images.

Figure 6A:
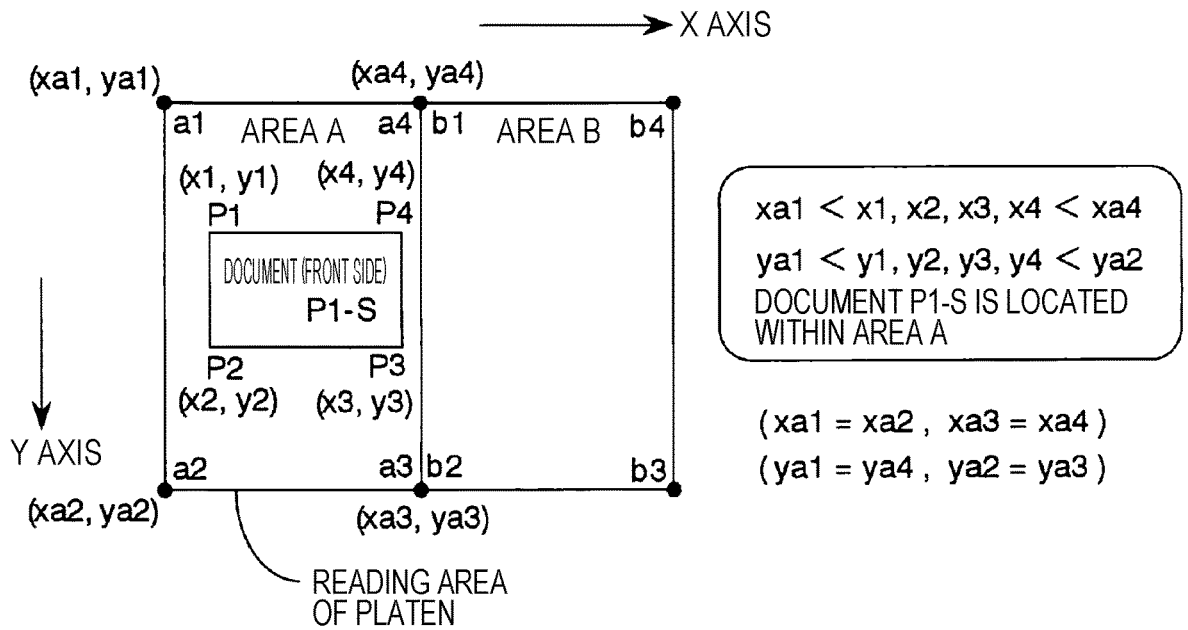
FIGS. 6A and 6B are diagrams illustrating examples of manners in which it is determined whether a document is located within an area, in an image processing apparatus according to an embodiment of the present disclosure.
Figure 6B:
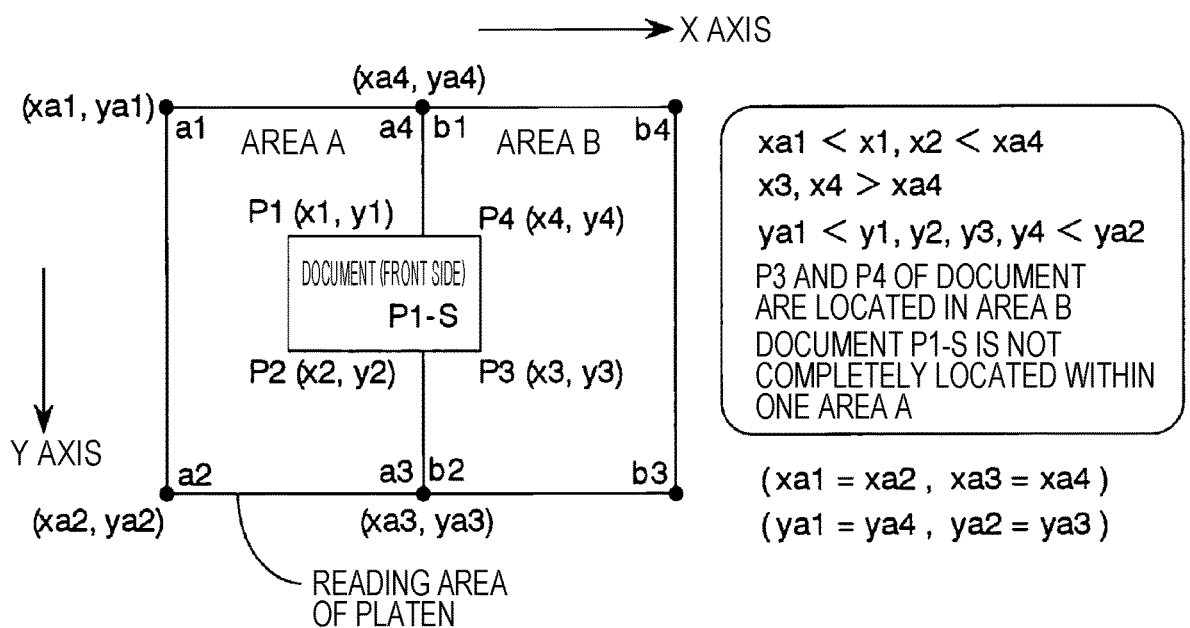

The individual image location judgment unit 19 is a unit configured to perform a judgment (a positioning-in-area judgment) on whether an extracted individual image is located within a set individual area (an area). FIGS. 6A and 6B are schematic diagrams illustrating examples of processes of determining whether a document is located within an area. FIGS. 6A and 6B, as with FIG. 3B, illustrate a case where the reading area of the platen is divided into two areas. FIG. 6A illustrates a case where a document P1-S is located within one area (an area A), while FIG. 6B illustrates a case where the document P1-S is not located within one area (the area A).

In the case where the document P1-S is located within one area (the area A) as shown in FIG. 6A, the position coordinates of four vertices (a1, a2, a3, and a4) of the area A and the position coordinates of four vertices (P1, P2, P3, and P4) of the document P1-S have a particular relationship as described below. The X-coordinates (x1, x2, x3, x4) of the four vertices (P1, P2, P3, P4) of the document P1-S are greater than the X-coordinate xa1 of the vertex a1 of the area A and smaller than the X-coordinate xa4 of the vertex a4 of the area A (xa1<x1, x2, x3, x4<xa4). The Y-coordinates (y1, y2, y3, y4) of the four vertices (P1, P2, P3, P4) of the document P1-S are, greater than the Y-coordinate ya1 of the vertex a1 of the area A and smaller than the Y-coordinate ya2 of the vertex a2 of the area A (ya1<y1, y2, y3, y4<ya2).

Conversely, when the position coordinates of four vertices (P1, P2, P3, and P4) of the document P1-S satisfy all relationships (judgment conditions) described above with respect to the position coordinates of the four vertices (a1, a2, a3, and a4) of one area A, it is determined that the document P1-S is located within the area A. Thus, the individual image location judgment unit 19 compares the position coordinates of the four vertices of each of all extracted individual images with the position coordinates of the four vertices of each set individual area (area), and checks whether the position coordinates satisfy the relationship described above. If the relationship is satisfied, the individual image location judgment unit 19 determines that the document corresponding to the individual image subjected to the check is located within one area.

On the other hand, in a case where the document P1-S is not located within in one area (the area A) as in the case shown in FIG. 6B in which, for example, the position coordinates of two vertices (P3 and P4) of the document P1-S are located in an area B outside the area A, the position coordinates of four vertices (a1, a2, a3, and a4) of the area A and the position coordinates of four vertices (P1, P2, P3, and P4) of the document P1-S have a particular relationship as described below. The X-coordinates (x1 and x2) of the two vertices (P1 and P2) of the document P1-S are greater than the X-coordinate xa1 of the vertex a1 of the area A and smaller than the X-coordinate xa4 of the vertex a4 of the area A (xa1<x1, x2<xa4). The X-coordinates (x3 and x4) of the two vertices (P3 and P4) of the document P1-S are greater than the X-coordinate xa4 of the vertex a4 of the area A (x3, x4>xa4). The Y-coordinates (y1, y2, y3, y4) of the four vertices of the document P1-S are greater than the Y-coordinate ya1 of the vertex a1 of the area A and smaller than the Y-coordinate ya2 of the vertex a2 of the area A (ya1<y1, y2, y3, y4<ya2).

In this case, the positions of two vertices (P3 and P4) of the document P1-S do not satisfy the judgment condition described above, that is, the two vertices (P1 and P2) of the document P1-S are located in the area A and the two vertices (P3 and P4) of the document P1-S are located in the area B, and thus it is determined that the document P1-S is not located within one area. In a case where it is determined that the document is located within one area, the individual image of this document is a candidate to be read. On the other hand, it is determined that the individual image is not located within one area, the location of the individual image of this document is not completely included within a reading area, and thus it is determined that the document capturing is not allowed.

When a user places documents, the user is supposed to place the documents with reference to boundaries between areas such that the documents are located within corresponding particular areas. However, in a case where there are a large number of areas or in a case where there is an area with a small size, there is a possibility that a placed document extends slightly beyond a boundary of an area. In such a case, there is a possibility that it is determined that the document capturing is not allowed. To avoid such a situation, a margin area may be provided near the boundary of the area.

In the examples shown in FIGS. 6A and 6B, a small margin area may be set near a boundary between the area A and the area B. For example, a thin and long rectangle area with a width of about 10 mm may be set in advance as a margin area such that the margin area is located in the area A and in contact with a boundary between the area A and the area B, and a thin and long rectangle area with a width of about 10 mm may be set in advance as a margin area such that the margin area is located in the area B and in contact with the boundary between the area A and the area B. In this case, when position coordinates of two vertices (P3 and P4) of the document P1-S are located outside the area A, that is, within the area B as illustrated in FIG. 6B, if the position coordinates of two vertices (P3 and P4) are located with the margin area in the area B, it is regarded that the document P1-S is located within the area A.

When a user places a document with the intention of placing it within a particular area, there is a possibility that the document is actually placed slightly beyond a boundary of the area. However, because the provision of the margin area described above, it is not determined that the document capturing is not allowed. Thus, it is allowed to continue the reading process without having to re-place the document. This results in a reduction in operation load imposed on the user.

Figure 5A:
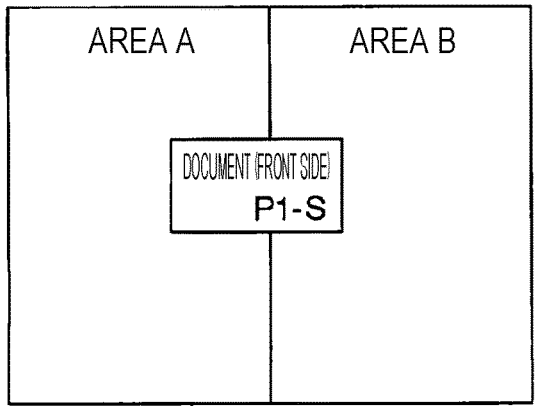
FIGS. 5A to 5E are diagrams illustrating examples in which it is determined that the document capturing is not allowed because of improper manners of placing document in an image processing apparatus according to an embodiment of the present disclosure.
Figure 5B:
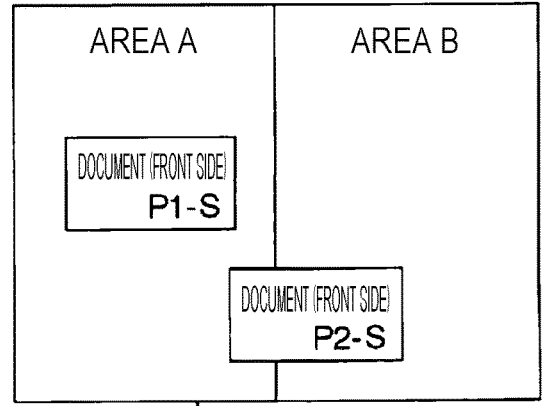

FIGS. 5A to 5E are diagrams illustrating examples in which it is determined that the document capturing is not allowed because of improper manners of placing document. FIG. 5A and FIG. 5B illustrate examples in which a document is placed over two areas. In this case, the document is not completely located within one reading area, and thus it is determined that the document capturing is not allowed. In a case where it is determined that the document capturing is not allowed, for example, a warning is given to a user to notify of an occurrence of a positioning error, and to prompt the user to re-place the document within a particular area and re-execute the reading operation on the document.

Figure 5C:
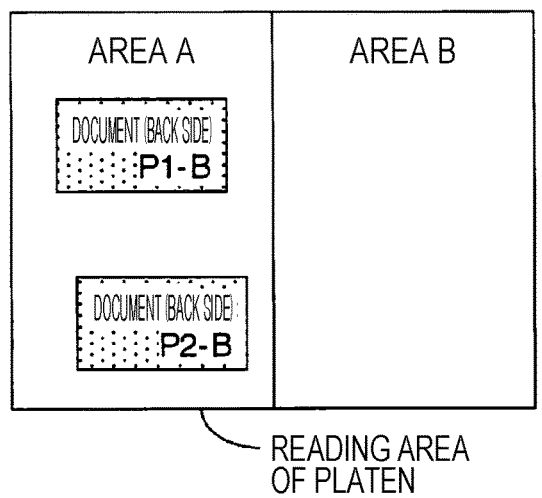
Figure 5D:
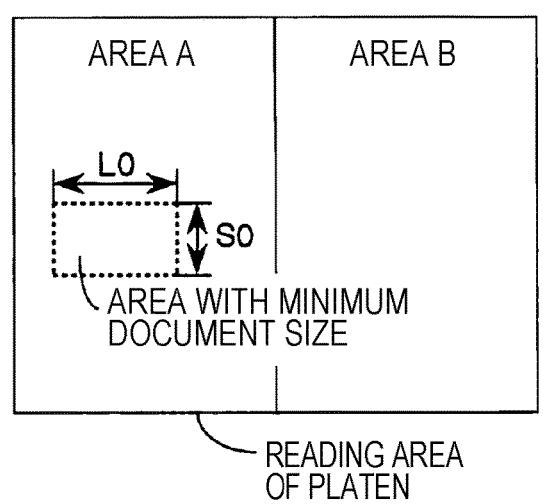
Figure 5E:
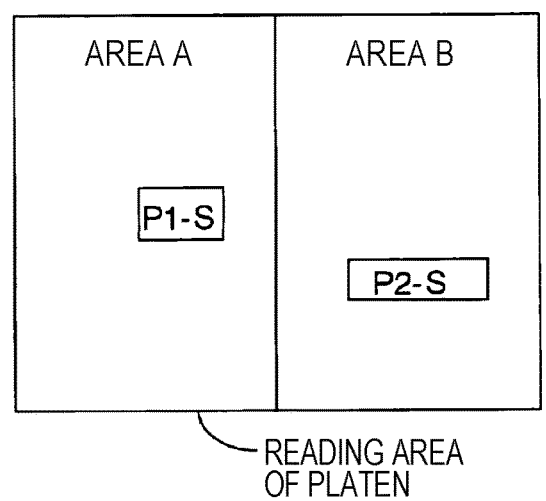

FIGS. 5C and 5E illustrate other examples in which it is determined that the document capturing is not allowed. In the example shown in FIG. 5C, two documents are located within one area, and thus two individual images are extracted from the one area. In this case, it may be allowed to select, as an image to be captured, one of the two individual images as described later with reference to FIGS. 7A to 7C. However, there is a possibility that actually only one document exists, and this one document is erroneously extracted into two individual images. To handle the above situation, when two or more individual images are extracted from one same area, it may be determined that the document capturing is not allowed.

FIG. 5D illustrates an example of a manner of setting minimum document size information defining a minimum value of a document that is allowed to be regarded as an individual image of a document to be read. For example, a rectangular minimum document area is set in advance as shown in FIG. 5D. More specifically, a longitudinal length L0 and a lateral length S0 are set in advance as the minimum document size information defining the minimum document area. When an individual image has an area size smaller than the area size of the rectangle defined by the longitudinal length L0 and the lateral length S0, it is determined that capturing of this individual image is not allowed. Alternatively, in a case where either a longitudinal length or a lateral length of the extracted individual image is smaller than the longitudinal length L0 or the lateral length S0 of the minimum document size information, it may be determined that capturing of this individual image is not allowed.

FIG. 5E illustrates an example in which the area size of the document P1-S existing in the area A is smaller than the area size of the rectangle defined by the longitudinal length L0 and the lateral length S0 described in the minimum document size information, and thus it is determined that the document P1-S is not to be captured. FIG. 5E also illustrates an example in which the lateral length, in the vertical direction, of the document P2-S existing in the area B is smaller than the lateral length S0 described in the minimum document size information, and thus it is determined that the document P2-S is not to be captured. In a case where an extracted individual image is very small, there is a possibility that an area where no document exists or an area where dust exists is erroneously detected as an image. To handle such a situation, a threshold value such as minimum document size information may be defined, and only when an individual image has a size greater than the threshold value, the individual image may be regarded as an image to be captured. In a case where a given individual image has size smaller than the threshold value, it may be preferable to determine that capturing of the individual image is not allowed thereby reducing the probability of an erroneous detection.

The individual image selection unit 20 is a unit configured to select an individual image such that in a case where one or a plurality of extracted individual images are located within a particular one individual area (area), one individual image is selected based on a predetermined selection criterion and the selected one individual image is employed as an image to be captured in this area. The selected one individual image is stored, as the image captured in the area, in the storage unit 50.

For example, in a case where only one individual image of the extracted individual images is located within particular one area, the individual image selection unit 20 selects this one individual image as the image to be captured in this area. Alternatively, one individual image located within the area may be compared with the minimum document size information, and if the individual image is greater than an image size set in advance in the minimum document size information, this individual image may be selected as an image to be captured in this area. However, in a case where the individual image is smaller than or equal to the image size set in advance in the minimum document size information, no individual image in this area is selected.

Figure 7A:
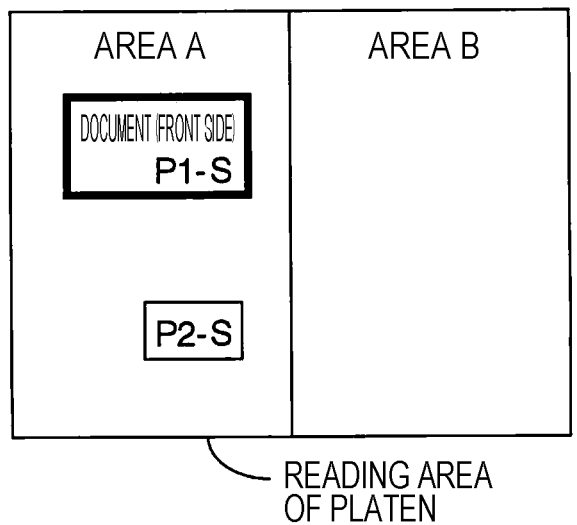
FIGS. 7A to 7C are diagrams illustrating examples of criteria for, in a case where it is detected that a plurality of documents are located in one area, selecting one document as a document to be captured.
Figure 7B:
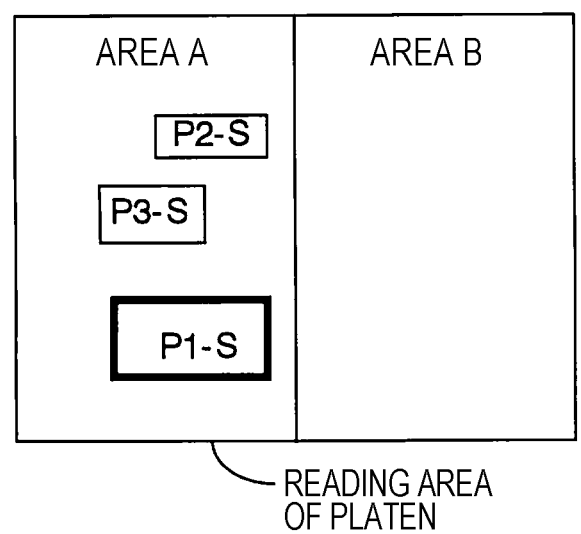
Figure 7C:
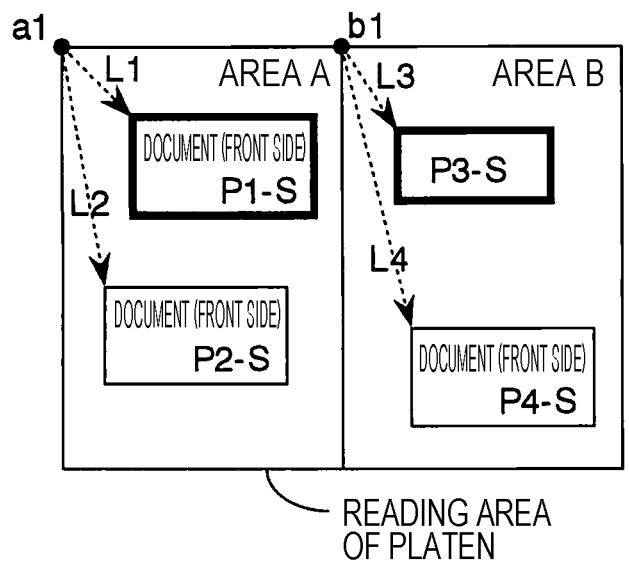

FIGS. 7A to 7C are diagrams illustrating examples of manners in which in a case where a plurality of documents located within one area are detected, one document is selected as a document to be read according to a selection criterion.

First Example of Selection Criterion

In a case where a plurality of extracted individual images are located within particular one area, a document having a size which is greater than the predetermined minimum document size information and which is the greatest of the plurality of individual images located within the one area is selected from the plurality of individual images located within the one area, for example, as shown in FIG. 7A. This makes it possible to correctly select one individual image without having a detection error due to dust or the like.

Second Example of Selection Criterion

In a case where a plurality of extracted individual images are located within in particular one area, an individual image of a document having a greatest size of the sizes of the plurality of individual images is selected as an image to be captured in this area as illustrated in FIG. 7B. In this case, the individual image of the document having the greatest size is selected from the plurality of individual images without taking into account the minimum document size information.

Third Example of Selection Criterion

In a case where a plurality of extracted individual images are located within particular one area, an individual image of a document placed at a position closest to a reference point of the area among all individual images located within the area is selected as an image to be captured in this area, as illustrated in FIG. 7C. In FIG. 7C, reference points of two areas (an area A and an area B) are taken at upper-left vertices (a1, b1) of the respective two areas. Of a plurality of individual images located within each area, an individual image having a shortest direct distance from the reference point of the area is selected as an image to be captured. For example, in the area A, when two direct distances (L1, L2) from the reference point a1 of the area A to the vertices of the individual images of the two documents (P1-S, P2-S) are compared to each other, if the direct distance L1 is smaller than the other, then the individual image of the document P1-S is located closest to the reference point a1 of the area A, and thus the document P1-S is selected as an image to be captured in the area A. Similarly, in the area B, the individual image of the document P3-S located closest to the reference point b1 of the area B is selected as an image to be captured in the area B.

Fourth Example of Selection Criterion

In the third example of the selection criterion described above, an individual image of a document at a location closest to a reference point of an area is selected as an image to be captured. In a fourth example of a selection criterion, a straight reference line defining a border of an area is used instead of the reference point, and an individual image of a document at a location closest to the reference line is selected as an image to be captured. For example, in FIG. 7C, a horizontal straight line passing through vertices a1 and b1 of an area A is employed as the reference line of the area A, and an individual image of a document at a location closest to the reference line is selected as an image to be captured. In the present example, an individual image of a document P1-S is at a location closest to the reference line, and thus this individual image is selected as an image to be captured in the area A. Alternatively, in FIG. 7C, a vertical straight line extending in a downward direction from the vertex a1 of the area A may be employed as the reference line of the area A. In the case where this vertical straight line is employed as the reference line, a document P2-S is at a location closer to the reference line than the location of the document P1-S, and thus an individual image of the document P2-S is selected as the image to be captured in the area A. In the area B, a reference line may be set in a similar manner.

Fifth Example of Selection Criterion

In a case where there is a plurality of extracted individual images in one individual area (area), there is a possibility that actually only one document exists in the individual area, but this one document is extracted into the plurality of individual images owing to a color or density difference across the surface of the document. In view of the above, when a plurality of extracted individual images are located within particular one area, the individual image selection may not be performed such that a detection error does not occur. In this case, as shown in FIG. 5C, it is determined that no individual image is to be captured, and a warning may be issued to notify that it is very likely that a document positioning error has occurred.

The output image generation unit 21 is a unit configured to generate output image information from information (read information) on individual images obtained by performing a reading process twice. The output image information is information including, for example, a document identification number and image data for each input individual image as will be described in further detail later. When image data of a front side and image data of a back side are associated together, it may be preferable to assign the same document identification number to them to indicate that they are image data of the same document. The output unit 15 outputs image data of an individual image specified in output image information according to preset output mode information. The outputting is performed, as described above, such that the image data is printed, stored in an external storage medium, or transmitted to a server.

The area location setting unit 22 is a unit configured to, before starting an operation of reading documents, set the number of areas (divided areas) and the locations thereof in the reading area of the platen depending on the number of documents to be read at a time. For example, in a case where a user inputs, via the operation unit 12, the number of documents to be read at a time, as many areas are set as the input number of documents. A user may directly input the number of areas to be set in the reading area of the platen. The set number of areas is stored as information indicating the number of divided areas in the storage unit 50.

After the number of areas is set, the locations of the respective divided areas are set, for example, as shown in FIGS. 2A to 2F, FIGS. 3A to 3C, or FIGS. 4A to 4H. Note that the number of areas is not limited to 1, 2, or 4, but the number of areas may be 3, 5, 6 or greater. It may be preferable that fixed locations of respective divided areas in the reading area of the platen are predetermined depending on the number of areas. It may be preferable that an information drawing schematically indicating locations of respective divided areas is displayed on the display unit 14 to notify the user, who is going to place the document, of the locations of the respective divided areas in the reading area of the platen.

Each document generally has two reading sides, that is, a front side and a back side. In the present disclosure, the front side and the back side of one document are read by performing a reading process twice. That is, a first-time reading process is performed to read one of reading sides (referred to as a first side) which may be either the front side or the back side, and a second-time reading process is performed to read the other reading side (referred to as a second side).

For example, FIGS. 2C and 2D illustrate examples of manners of placing a document in a case where the front side and the back side of the document are read. In a case where the number of documents to be read is one, the area setting is performed such that the reading area of the platen is employed as one reading area A as shown in FIG. 2A. In the case where the number of documents to be read is one, first, in the first-time reading process, in order to read a particular first side (for example, a front side P1-S) of reading sides of the document, the one document is placed at an arbitrary location on the platen, for example, as shown in FIG. 2C, and the image input unit 13 reads the first side. Next, in the second-time reading process, the document is turned over and placed at an arbitrary location on the platen, for example, as shown in FIG. 2D, and the image input unit 13 reads the second side (a back side P1-B) different from the first side.

Thereafter, an individual image of the first side and an individual image of the second side of the document read by the individual image extraction unit 16 are extracted, and the extracted individual images of the first and second sides are associated together as image information of the front and back side of the one document. The image information of associated front and back sides is printed on one printing sheet, for example, as shown in FIG. 2E. In the case where the number of documents to be read is one, because the whole reading area of the platen is assigned as the area A, the one document is allowed to be placed at an arbitrary location within the reading area of the platen.

In a case where a plurality of documents are to be read at a time, in order to read a particular first side, of two reading sides, of each document of the plurality of documents, for example, the plurality of documents are placed on the platen such that one document is located in one of the divided areas set in the reading area of the platen, and the image input unit 13 reads the first side of each document (in a first-time reading process). In this first-time reading process, image data including the first side of each document (the whole image data of the reading area of the platen) is read. After the first side of each document is read, the plurality of documents are turned over and placed such that each document is located in the same divided area in which the first side of the document is read, and the image input unit 13 reads the second side different from the first side of each document (in a second-time reading process). In this second-time reading process, image data including the second side of each document (the whole image data of the reading area of the platen) is read.

Figure 3C:
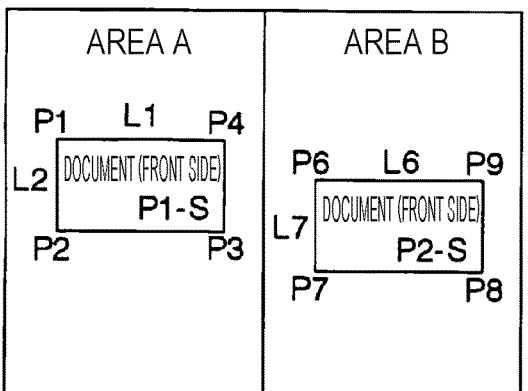
Figure 3D:
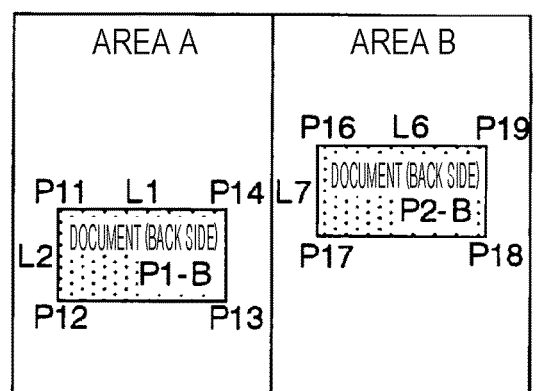
Figure 3E:
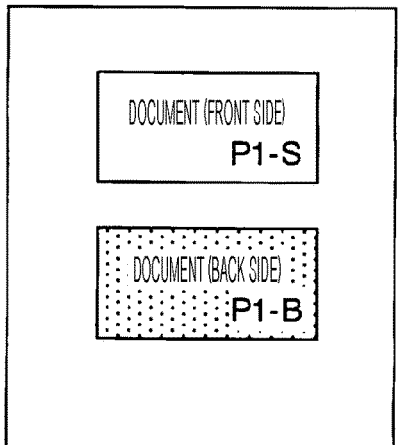
Figure 3F:
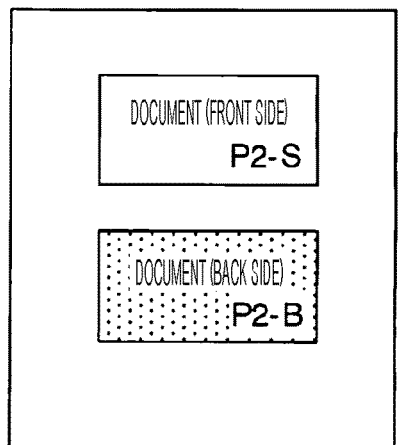

FIGS. 3C and 3D illustrate examples of manners of placing documents for a case where front and backs sides of two documents are read. In a case where the number of documents to be read is two, the reading area of the platen are divided into two areas which are respectively set as two reading areas (an area A and an area B), for example, as shown in FIG. 3A. In the case where the number of documents to be read is two, first, in order to read a particular first side (for example, a front side P1-S and a front side P2-S) of reading sides of the documents, the two documents are respectively placed in the area A and the area B, for example, as shown in FIG. 3C, and the image input unit 13 reads the first side of each document. Thereafter, the two documents are turned over and placed such that each document is located in the same divided area in which the first side of the document is read, for example, as shown in FIG. 3D, and the image input unit 13 reads the second side of each document (a back side P1-B and a back side P2-B) different from the first side.

FIGS. 4C and 4D illustrate examples of manners of placing four documents for a case where the front side and the back side of each document are read. In a case where the number of documents to be read is four, the reading area of the platen are divided into four areas which are respectively set as four reading areas (an area A, an area B, an area C, and an area D), for example, as shown in FIG. 4A. In the case where the number of documents to be read is four, first, in order to read a particular first side (for example, a front side P1-S, a front side P2-S, a front side P3-S, and a front side P4-S) of reading sides of the documents, the four documents are respectively placed in the four areas (the areas A to D), for example, as shown in FIG. 4C, and the image input unit 13 reads the first side of each document. Next, the four documents are turned over and placed such that each document is located in the same divided area in which the first side of the document is read, for example, as shown in FIG. 4D, and the image input unit 13 reads the second side of each document (a back side P1-B, a back side P2-B, a back side P3-B, and a back side P4-B) different from the first side.

Next, in either case where the number of documents to be read is two or a case where the number of documents to be read is four, individual images of the first sides of the respective documents are extracted from image data obtained in the first-time reading process, and individual images of the second sides of the respective documents are extracted from image data obtained in the second-time reading process. Furthermore, it is checked whether extracted individual images of the first side and the second side of each document are located within a correct area set in the reading area of the platen. In a case where one or a plurality of extracted individual images of each document are located within a correct area, one individual image of the first side of the one document and one individual image of the second side of the one document are selected based on a predetermined selection criterion and the selected individual images are employed as images to be captured in this area.

Thereafter, in either case where the number of documents to be read is two or a case where the number of documents to be read is four, the individual image extraction unit 16 extracts individual images of first sides of the respective read documents and individual images of second sides of the respective read documents, and the individual image of the first side of a document placed in a particular divided area of the platen and the individual image of the second side of a document placed in the same particular divided area are associated together, for each of the plurality of documents, as image information of the front and back side of the one document. The image information of associated front and back sides of each document is printed on one printing sheet separately for each document, for example, as shown in FIGS. 3E and 3F or FIGS. 4E to 4H.

Note that in the case where a plurality of documents are to be read, the first sides of the respective documents to be read in the first-time reading process may or may not be the front sides for all documents or may or may not be the back sides for all documents. The first sides may be a mixture of front sides and back sides such that the first sides may be the front sides for some document, and may be back sides for the remaining documents. Similarly, as for the second sides of the plurality of documents read in the second-time reading process, the second sides may be a mixture of front sides and back sides such that the second sides may be the front sides for some document, and may be back sides for the remaining documents.

As described above, for one document or for each document of a plurality of documents, the document is placed such that the location of an individual image obtained in the first-time reading process is in the same area as the area in which an individual image obtained in the second-time reading process is located, and thus it is possible to easily and accurately associate image data of the front side of one document and image data of the back side of the same document. Furthermore, the number and locations of areas where documents are to be placed are set in advance depending on the number of documents to be read, and thus if a user inputs a value specifying the number of divided areas corresponding to the number of documents to be read, and if the user places documents within the respective areas, then individual images of the respective documents are automatically extracted. This results in a reduction in operation load imposed on the user in the process of reading one or more documents.

The storage unit 50 is a unit configured to store information and/or a program used in executing one or more functions of the image processing apparatus according to the present disclosure. For example, a semiconductor memory device such as a ROM, a RAM, a flash memory, or the like, a storage apparatus such as an HDD, an SSD, or the like or other storage medium may be used as the storage unit 50. In the storage unit 50, for example, information indicating the number of divided areas 51, area coordinate information 52, output mode information 53, minimum document size information 54, read information 55, output image information 56, and/or the like are stored. FIGS. 8A to 8G and FIGS. 9A to 9I illustrate examples of information stored in the storage unit 50 of the image processing apparatus.

The information indicating the number of divided areas 51 is information indicating the number of areas into which the reading area of the platen is divided. A user may input a value specifying the number of divided areas depending on the number of documents to be read. The number of areas into which the reading area of the platen is divided and locations thereof are set according to the input information indicating the number of divided areas 51, and position coordinates of each divided area are calculated by the area coordinate calculation unit 17.

However, the number of divided areas is basically equal to the number of documents to be read, and thus a user may input the number of documents to be read. In this case, the input number of documents is employed as the number of divided areas, and this number is set and stored in the information indicating the number of divided areas 51. For example, in a case where the number of documents to be read is one, a user may input one. In response, one is set and stored in the information indicating the number of divided areas 51, for example, as shown in FIG. 8A.

The area coordinate information 52 is information indicating locations of divided areas set according to the information indicating the number of divided areas 51. The area coordinate information 52 is determined and stored by the area coordinate calculation unit 17. The area coordinate information 52 includes, for example, an area number, and coordinates of four vertices defining an area (area vertex location coordinates). In a case where the information indicating the number of divided areas 51 specifies one, "A" is set as the area number, and XY-coordinate values of four vertices (a1, a2, a3, and a4) of the area A are stored as area vertex location coordinates, for example, as shown in FIGS. 8C and 8D. In a case where the information indicating the number of divided areas 51 specifies two, the number of divided areas is two, and thus two area numbers (A and B) are set and XY-coordinate values of four vertices (a1, a2, a3, and a4) and four vertices (b1, b2, b3, and b4) are stored as area vertex location coordinates for the respective areas as shown in FIGS. 9D and 9E.

The output mode information 53 is information indicating a preset output mode of outputting a read individual image. In a case where there are a plurality of available output modes, a user may perform inputting operation to specify or select an output mode from the plurality of output modes. Alternatively, one of output modes may be set in advance as an initial output mode. FIG. 8B illustrates an example of the output mode information 53. In this example, four available output modes are set in advance. A user may select or specify one of the four output modes before a document reading operation is executed. Note that the output modes are not limited to four examples described above, but one or more other output modes may be set in advance. FIGS. 10A to 10I illustrate examples of manners of printing in modes corresponding to the four output modes specified in the output mode information shown in FIG. 8B.

Figure 10A:
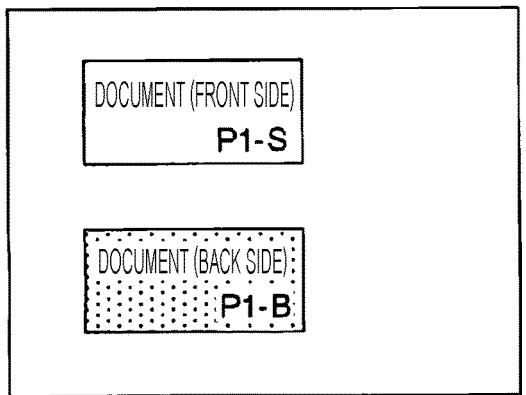
FIGS. 10A to 10I illustrates examples of manners of printing a plurality of scanned documents in an image processing apparatus according to an embodiment of the present disclosure.
Figure 10B:
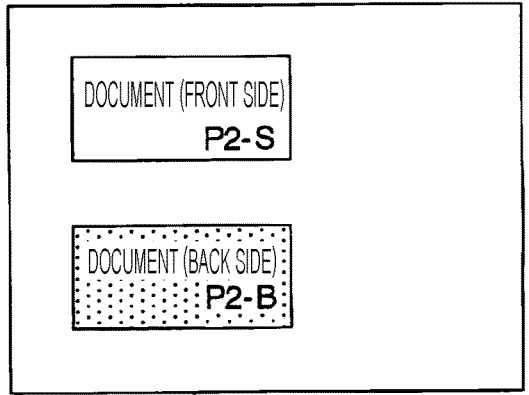

For example, an output mode with mode number 1 is a mode in which front and back sides are output together. In a case where this output mode is selected, the front side and the back side of each document are combined together into one piece of image data and output. In this case, image data of the front side of a document and image data of the back side of the same document are printed on one printing sheet, for example, as illustrated in FIG. 10A or 10B.

Figure 10C:
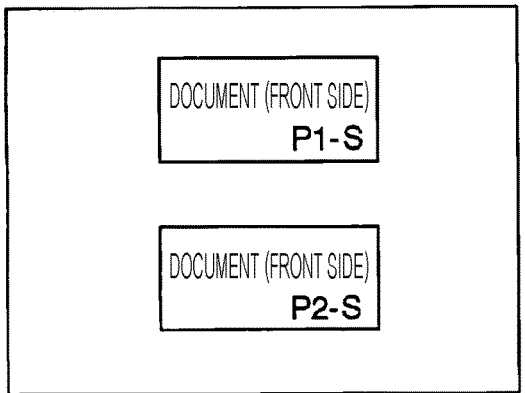
Figure 10D:
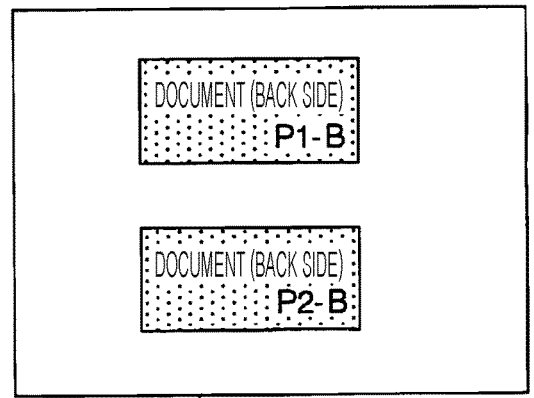

An output mode with mode number 2 is a mode in which images of front side and back side are output separately. In a case where this output mode is selected, read image data of the front side and image data of the back side are separately combined into different image data. That is, a plurality of pieces of image data of front sides of a plurality of documents are combined into one piece of image data, and, separately, a plurality of pieces of image data of back sides of a plurality of documents are combined into one piece of image data. In this case, for example, as shown in FIG. 10C or 10D, the plurality of pieces of image data of front sides of the plurality of documents are combined and printed on one printing sheet, and the plurality of pieces of image data of back sides of the plurality of documents are combined and printed on another printing sheet.

Figure 10E:
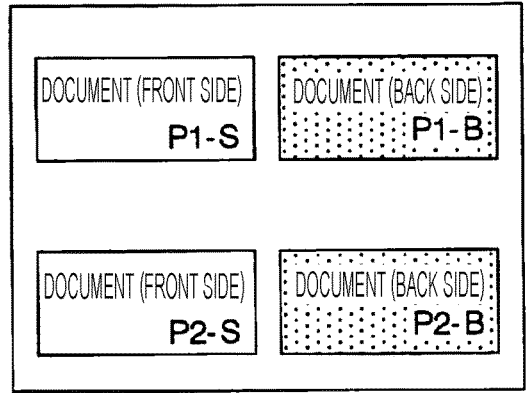
Figure 10F:
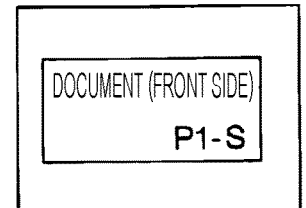
Figure 10G:
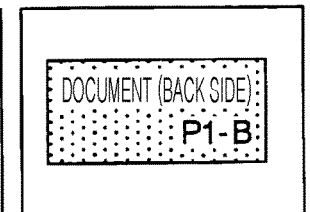
Figure 10H:
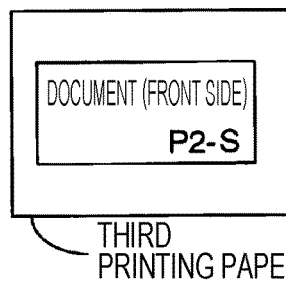
Figure 10I:
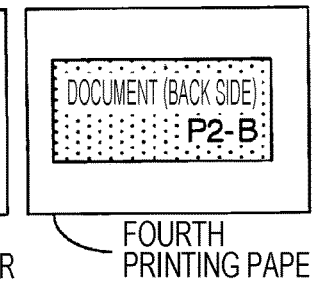

An output mode with mode number 3 is a mode in which all images are output together on one sheet. In a case where this output mode is selected, image data of front sides and image data of back sides of all read documents are combined into one piece of image data and output on one printing sheet. In this case, for example, as shown in FIG. 10E, image data of front sides and image data of back sides of two different documents are combined together and printed on the one same printing sheet.

An output mode with mode number 4 is a mode in which input images are individually output. In a case where this output mode is selected, individual images acquired for read documents are separately output. In this mode, even for the same document, image data of the front side and image data of the back side are printed on different sheets. For example, as shown in FIGS. 10F to 10I, two pieces of image data of front sides and two pieces of image data of back sides of two documents are each printed separately on one printing sheet.

The minimum document size information 54 is information indicating a minimum value, set in advance, of a document to be read. In a case where a document to be read has a rectangular shape, for example, a longitudinal length L0 and a lateral length S0 of the rectangular are set. FIGS. 9B and 9C illustrates an example of minimum document size information 54. In this example, 80 mm is set as the longitudinal length L0 and 40 mm is set as the lateral length S0 as the minimum document to be read.

In a case where the minimum document size information 54 is set as in the present example, when the longitudinal length of an extracted individual image is smaller than 80 mm, this individual image is not employed as an image to be captured. Also when the lateral length of an extracted individual image is smaller than 40 mm, this individual image is not employed as an image to be captured. Furthermore, also in a case where the area size of an extracted individual image is smaller than 80 mm×40 mm, this individual image may not be employed as an image to be captured. As for the minimum document size information 54, fixed values may be set in advance, or a user may set or change the values.

The read information 55 is information on image data obtained in the reading operation performed twice. FIG. 8E illustrates an example of read information 55. More specifically, FIG. 8E illustrates an example of read information 55 for a case where one document is read, and the read information 55 includes image data acquired in the first-time reading and image data acquired in the second-time reading. For example, one piece of read information includes a read sequence number, an input image number, document vertex position coordinates, a horizontal length, a vertical length, an area number, image data, and an image identification number.

The read sequence number is a number indicating the count of the number of times the read operation is performed. For example, SC01 is set as read sequence number for image data acquired in the first-time reading, while SC02 is set as the read sequence number for image data acquired in the second-time reading.

The input image number indicates a number assigned to an individual image extracted from whole image data acquired in the first-time reading process. In a case where a plurality of documents are placed and read at a time, a plurality of individual images are extracted, and different numbers are assigned to the respective extracted individual images. In the example shown in FIG. 8E, N01 is assigned as an input image number to an individual image extracted in the first-time reading, while N02 is assigned as an input image number to an individual image extracted in the second-time reading.

The document vertex position coordinates are XY-coordinate values indicating a location of an extracted individual image. The XY-coordinate values are represented in an XY-coordinate system set in the reading area of the platen. In a case where a document has a rectangular shape, the document vertex position coordinates include XY-coordinate values of four vertices of the rectangle. For example, for the individual image acquired via the first time reading (SC01) shown in FIG. 8E, document vertex position coordinates indicate XY-coordinate values of four vertices (P1, P2, P3, and P4) of the document P1-S shown in FIG. 2C. For the individual image acquired via the second-time reading (SC02) shown in FIG. 8E, document vertex position coordinates indicate XY-coordinate values of four vertices (P6, P7, P8, and P9) of the document P1-B shown in FIG. 2D.

The horizontal length is a horizontal length of a rectangle defined by XY-coordinate values of four vertices. More specifically, the horizontal length indicates the length of the rectangle as seen in a direction along the longitudinal direction of the reading area of the platen. The vertical length is a vertical length of the rectangle defined by XY-coordinate values of the four vertices. More specifically, the vertical length indicates the length of the rectangle as seen in a direction along the lateral direction of the reading area of the platen. The horizontal length L1 and the vertical length L2 are determined, for example, by calculating the horizontal length and the vertical length of the document shown in FIG. 2C or 2D from the XY-coordinates of the four vertices. The horizontal length L1 and the vertical length L2 are used in making a comparison with the minimum document size information 54 and determining whether an acquired individual image is employed as an image to be captured.

The area number is information identifying an area in which an extracted individual image is located. For example, in a case where the number of divided areas is one, "A" is set as the area number. The image data is information described in a document read by the scanner and stored for each extracted individual image. In the example shown in FIG. 8E, file names (IMG001, IMG002), in which image data is stored, are indicated.

The document identification number is a number for distinguishing between read documents. The same identification number is assigned to individual images acquired for the front side and the back side for the same document. In the present disclosure, it is assumed that a front side image and back side image of same one document are read in the same area, and thus individual images assigned the same area numbers are assigned the same document identification numbers. In the example shown in FIG. 8E, the same document identification number G01 is assigned to two individual images acquired in the same area A. However, in the present disclosure, two individual images read from the same area via a reading operation performed twice are images of the front side and the back side of the same document, and thus, only an area number may be set without setting the document identification number.

Therefore, for the image data acquired in the first-time reading shown in FIG. 8E, SC-01 is assigned as the read sequence number and N01 is assigned as the input image number of the extracted individual image. Furthermore, XY-coordinate values indicating the four vertices (P1, P2, P3, and P4) of the rectangle defining the area of the extracted individual image and the horizontal length L1 and the vertical length L2 of the rectangle are determined and stored. Furthermore, A is assigned as the area number of the area in which the individual image was placed, and the image data of the extracted individual image is stored in the file with file name IMG001, and G01 is assigned as the document identification number.

Similarly, for the read information of the image data acquired in the second-time reading shown in FIG. 8E, SC02 is assigned as the read sequence number and N02 is assigned as the input image number of the extracted individual image. Furthermore, XY-coordinate values indicating the four vertices (P6, P7, P8, and P9) of the rectangle defining the area of the extracted individual image and the horizontal length L1 and the vertical length L2 of the rectangle are determined and stored. Furthermore, A is assigned as the area number of the area in which the individual image was placed, and the image data of the extracted individual image is stored in the file with file name IMG002, and G01 is assigned as the document identification number.

FIG. 9F illustrates an example of read information 55 for a case where the number of read documents is two and the number of divided areas is two. In this example, the read information 55 is obtained for a case where, as shown in FIGS. 3C and 3D, two documents are respectively placed in two divided areas (the area A and the area B) and reading is performed twice. FIG. 9F illustrates an example of read information 55 for a case where two documents are read, and the read information 55 includes two pieces of image data acquired in the first-time reading two pieces of image data acquired in the second-time reading Detailed items of the read information 55 are similar to those described above with reference to FIG. 8E.

In FIG. 9F, as for read information on image data acquired in the first-time reading, because two documents are read, read information is acquired for an individual image located within the area A and for an individual image located within the area B. In the first-time reading, SC01 is assigned as the read sequence number.

As for the individual image located within the area A, for example, N01 is assigned as the input image number. Furthermore, as shown in FIG. 3C, XY-coordinate values indicating the four vertices (P1, P2, P3, and P4) of the rectangle defining the area of the extracted individual image and the horizontal length L1 and the vertical length L2 of the rectangle are determined and stored. Furthermore, A is assigned as the area number of the area in which the individual image was placed, and the image data of the extracted individual image is stored in the file with file name IMG011, and G01 is assigned as the document identification number.

As for the individual image located within the area B, for example, N02 is assigned as the input image number. Furthermore, XY-coordinate values indicating the four vertices (P6, P7, P8, and P9) of the rectangle defining the area of the extracted individual image, and the horizontal length L6 and the vertical length L7 of the rectangle are determined and stored. Furthermore, B is assigned as the area number of the area in which the individual image was placed, and the image data of the extracted individual image is stored in the file with file name IMG012, and G02 is assigned as the document identification number.

Similarly, for the read information on the image data acquired in the second-time reading shown in FIG. 9F, because there are two read documents, read information is acquired for an individual image located within the area A and for an individual image located within the area B. In the second-time reading, SC02 is assigned as the read sequence number.

As for the individual image located within the area A, for example, N03 is assigned as the input image number. Furthermore, as shown in FIG. 3D, XY-coordinate values indicating the four vertices (P11, P12, P13, and P14) of the rectangle defining the area of the extracted individual image and the horizontal length L1 and the vertical length L2 of the rectangle are determined and stored. Furthermore, A is assigned as the area number of the area in which the individual image was placed, and the image data of the extracted individual image is stored in the file with file name IMG021, and G01 is assigned as the document, identification number.

As for the individual image located within the area B, for example, N04 is assigned as the input image number. Furthermore, as shown in FIG. 3D, XY-coordinate values indicating the four vertices (P16, P17, P18, and P19) of the rectangle defining the area of the extracted individual image, and the horizontal length L6 and the vertical length L7 of the rectangle are determined and stored. Furthermore, B is assigned as the area number of the area in which the individual image was placed, and the image data of the extracted individual image is stored in the file with file name IMG022, and G02 is assigned as the document identification number.

The output image information 56 is information generated by the output image generation unit 21 and is used in outputting individual images acquired via a reading operation performed twice. The output image information 56 includes items included in the read information 55 described above. FIG. 8F illustrates an example of output image information 56. In this example, the output image information 56 includes an input image number, a document identification number, and image data.

In a case where the output image information 56 includes only items which are part of items included in the read information 55, there is no information to be newly generated. Therefore, when an individual image is output, items to be included in the output image information 56 may be read out from the stored read information 55, and the output image information 56 may be generated using the obtained items. FIG. 8F illustrates two pieces of output image information 56 generated by reading out part of items included in the read information 55 shown in FIG. 8E. In these two pieces of output image information 56, two piece of image data (IMG001 and IMG002) read out are image data of the front side of a document and image data of the back side of the same document.

If the output mode with output mode number 1 in which "front and back sides are output together" is specified in the output mode information 53 which has been set in advance, then, when an image is printed using these two pieces of output image information 56, the front-side image data (IMG001) and the back-side image data (IMG002) of the same document are combined together and printed on one sheet of paper, for example, as shown in an example in FIG. 8G.

FIG. 9G illustrates an example of output image information 56 for a case where the number of documents to be read is two and the number of divided areas is two. In this example, the output image information 56 includes the input image number, the document identification number, and the image data, which are included in the read information 55 shown in FIG. 9F. In the output image information 56, two pieces of image data (IMG011 and IMG021) of four pieces of image data (IMG011 to IMG022) are assigned the same document identification number G01, which indicates that they are front-side image data and back-side image data of the same document identified by the document identification number G01. On the other hand, the other two pieces of image data (IMG012 and IMG022) are assigned the same document identification number G02, which indicates that they are front-side image data and back-side image data of the same document identified by the document identification number G02.

Thus, if the output mode with output mode number 1 in which "front and back sides are output together" is specified in the output mode information 53 which has been set in advance, then, when an image is printed using the output image information 56, the front-side image data (IMG011) and the back-side image data (IMG021) of the same document identified by the document identification number G01 are combined together and printed on first paper, for example, as in an example shown in FIG. 9H, while the front-side image data (IMG012) and the back-side image data (IMG022) of the same document identified by the document identification number G02 are combined together and printed on second paper, for example, as in an example shown in FIG. 9I.

Figure 11:
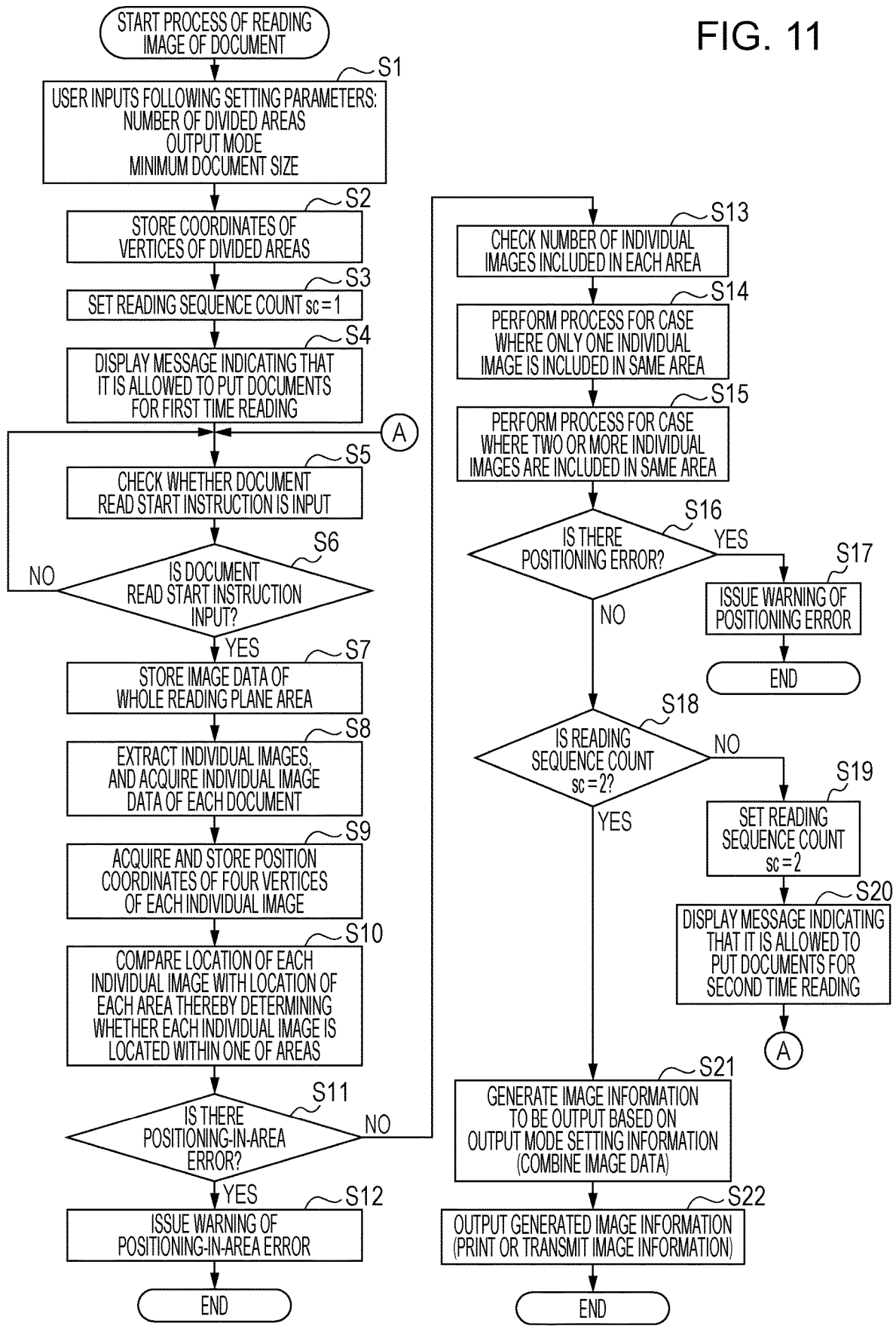
FIG. 11 is a flow chart illustrating an example of a document reading process and associated processes performed by an image processing apparatus according to an embodiment of the present disclosure.

Processing Flow of Image Processing and Associated Processing Performed in Image Processing Apparatus According to the Present Disclosure FIG. 11 is a flow chart illustrating an example of a document reading process and associated processes performed by an image processing apparatus according to an embodiment of the present disclosure. In the process, first, a user inputs a value specifying the number of divided areas corresponding to the number of documents to be read. After the user places documents in the respective areas, if the user performs an input operation to issue a read start instruction, the reading process and associated processes are executed. The reading process is performed twice, and two individual images obtained in the same area are associated together as the front side and the back side of the same document.

In any one area, image data of one document is read. When a document is placed across two areas, or when a size of an extracted image of a document is too small, it is determined that a positioning error occurs and error handling is performed. In a case where two or more individual images are detected in one area, only one individual image is selected as an image to be captured according to one of criteria shown in FIGS. 7A to 7C, or it is determined that the image capturing is not allowed as shown in FIG. 5C, and it is determined that a positioning error occurs and error handling is performed.

In step S1 in FIG. 11, it is checked whether inputting for setting has been performed by a user. For example, the checking is performed in terms of inputting the number of divided areas, an output mode, and the minimum document size. In a case where inputting by the user is performed, the input information is stored in the storage unit 50. In a case where the number of divided areas corresponding to the number of documents to be read is input, and the input value is stored as information indicating the number of divided areas 51, and the area location setting unit 22 determines the number of areas into which the reading area of the platen is to be divided, and determines the location of each area. The shape of each area is set to have a rectangular shape. When the output mode and the minimum document size are input, the output mode and the minimum document size are respectively stored as output mode information 53 and minimum document size information 54 in the storage unit 50.

In step S2, the area coordinate calculation unit 17 calculates coordinates of four vertices of each determined divided area, and stores the calculated coordinates as area coordinate information 52 for each divided area. In step S3, for preparation for performing a first-time reading process, 1 is set as an initial value in a variable (sc) indicating the reading sequence count.

In step S4, a message is displayed on the display unit 14 to notify a user that it is allowed to place documents on the platen for the first-time reading. In a case where a plurality of documents are placed on the platen, to make it possible for a user to easily and surely place documents within correct areas, it may be preferable to display an illustration showing boundaries between areas where the documents are to be placed. According to the displayed illustration, the user may place the documents in the reading area of the platen, and may performing an inputting operation to start reading the documents.

In step S5, it is checked whether the user has performed the inputting operation to start reading the documents. In a case where it is determined in step S6 that the user has performed the inputting operation to start reading the documents, the processing flow proceeds to step S7, but otherwise the processing flow returns to step S5.

In step S7, the whole reading side of the reading area of the platen is scanned thereby acquiring image data of over the whole reading area, and the acquired image data is temporarily stored in the storage unit 50. In step S8, the individual image extraction unit 16 extracts individual images from the whole-reading-area image data. Image data of each extracted individual image is acquired and stored as read information 55 for each individual image. More specifically, for example, as shown in FIG. 8E, a read sequence number SC01, an input image number N01, and image data IMG001 are stored as the read information 55.

In step S9, the individual image coordinate acquisition unit 18 acquires position coordinates of four vertices for each extracted individual image, and stores the acquired position coordinates as document vertex position coordinates. Using these document vertex position coordinates, the individual image coordinate acquisition unit 18 calculates the horizontal length and the vertical length of each individual image and stores the result.

In step S10, it is determined whether each individual image is located within one area by comparing the location of the individual image with the location of each area (judgment on document positioning within area). An example of the judgment on document positioning within area according to an embodiment will be described later with reference to FIG. 12. In the judgment on document positioning within area, in a case where each of all extracted individual images is located within one of areas, positioning-in-area error information is set so as to indicate that no positioning error occurs in the positioning-in-area judgment, and the information is output. On the other hand, in a case where there is an individual image that is not completely located within one of areas, positioning-in-area error information is set so as to indicate that a positioning error occurs in the positioning-in-area judgment, and the information is output.

In step S11, it is checked whether or not the result of the positioning-in-area judgment in step S10 indicates an occurrence of a positioning error. In a case where the result of the positioning-in-area judgment indicates an occurrence of a positioning error, the processing flow proceeds to step S12. However, in a case where the result of the positioning-in-area judgment indicates no occurrence of a positioning error, the processing flow proceeds to step S13.

If the result of the positioning-in-area judgment indicates an occurrence of a positioning error, then in step S12, a warning is given to a user to notify that the result of the positioning-in-area judgment indicates an occurrence of positioning error. For example, a message is displayed on the display unit 14 to notify that a document is not correctly placed within an area thereby prompting the user to re-place the document. In a case where an audio speaker is provided, a voice message may be output to notify of the above fact. Thereafter, the process may be ended or the processing flow may return to step S5 to repeat the process described above.

In step S13, checking is performed on the number of individual images included in each area. For example, the checking may be performed by counting the number of individual images assigned the same area number in read information. In a case where the number of individual images included in one same area is one, step S14 is performed next. However, in a case where the number of individual images included in one same area is two or greater, step S15 is performed.

An example of the process (the process in step S14) performed when the number of individual images included in one same area is one will be described later with reference to FIG. 13 and FIG. 14. An example of the process (the process in step S15) performed when the number of individual images included in one same area is two or greater will be described later with reference to FIGS. 15 to 17.

In steps S14, for an area in which only one individual image exists, information of this individual image is stored in the output image information 56. Alternatively, the size of the individual image may be compared with the minimum document size information, and, if the size individual image is greater than the minimum document size, the information of the individual image may be stored in the output image information 56, but otherwise it is determined that the size of the extracted individual image is smaller than the minimum allowable size, and information indicating an occurrence of a positioning error may be output. In a case where the information of the individual image is stored in the output image information 56, information indicating no occurrence of a positioning error is output.

In the process in step S15, for an area in which two or more individual images exist, for example, an individual image whose size is greater than the minimum document size and is the greatest among the all individual images existing in the area is selected, and information of the selected individual image is stored in the output image information 56. Alternatively, the distance (reference distance) of each individual image in the area of interest from the reference point of the area of interest is calculated, and one individual image corresponding to the smallest reference distance may be selected, and the information of the selected individual image may be stored in the output image information 56. In a case where two or more individual images exist in an area, it may be determined that this does not meet the document positioning rule indicating that only one document is allowed to be placed in one area, and thus information indicating an occurrence of a positioning error may be output. Also in the process in step S15, in a case where the individual image information is stored in the output image information 56, information indicating no occurrence of a positioning error is output.

In step S16, it is checked whether an occurrence of a positioning error is indicated in the result of the process on the individual image in step S14 or in the result of the process on the individual image in step S15. In a case where a positioning error occurs in the process in either step S14 or S15, the processing flow proceeds to step S17. In a case where no positioning error occurs in either step S14 or S15, the processing flow proceeds to step S18. In step S17, as in step S12, a warning is given to a user via a visual message or an audio message to notify of the occurrence of the document positioning error. Thereafter, the process is ended or the processing flow returns to step S5 to continue the process.

In step S18, it is checked whether the variable (sc) indicating the reading sequence count is 2. In a case where the variable (sc) indicating the reading sequence count is 2, the processing flow proceeds to step S21, but otherwise (in a case where sc=1), the processing flow proceeds to step S19. In step S19, 2 is set in the variable (sc) indicating the reading sequence count. In step S20, a message is displayed on the display unit 14 to notify a user that it is allowed to place documents on the platen for the second-time reading. Thereafter, the processing flow returns to step S5.

In step S21, after the second-time reading process is completed, image information is generated based on the preset output mode information 53. For example, in a case where "front and back sides are output together" is specified in the output mode information 53, stored front-side image data and back-side image data are combined such that resultant combined image data is allowed to be output on one sheet of paper. In step S22, the output unit 15 outputs the generated image information. More specifically, for example, the generated image information is printed on one sheet of printing paper or is transmitted to an external information processing apparatus via a network. An example of an image reading process performed by the image processing apparatus according to an embodiment of the present disclosure has been described above with reference to the flow chart.

Figure 12:
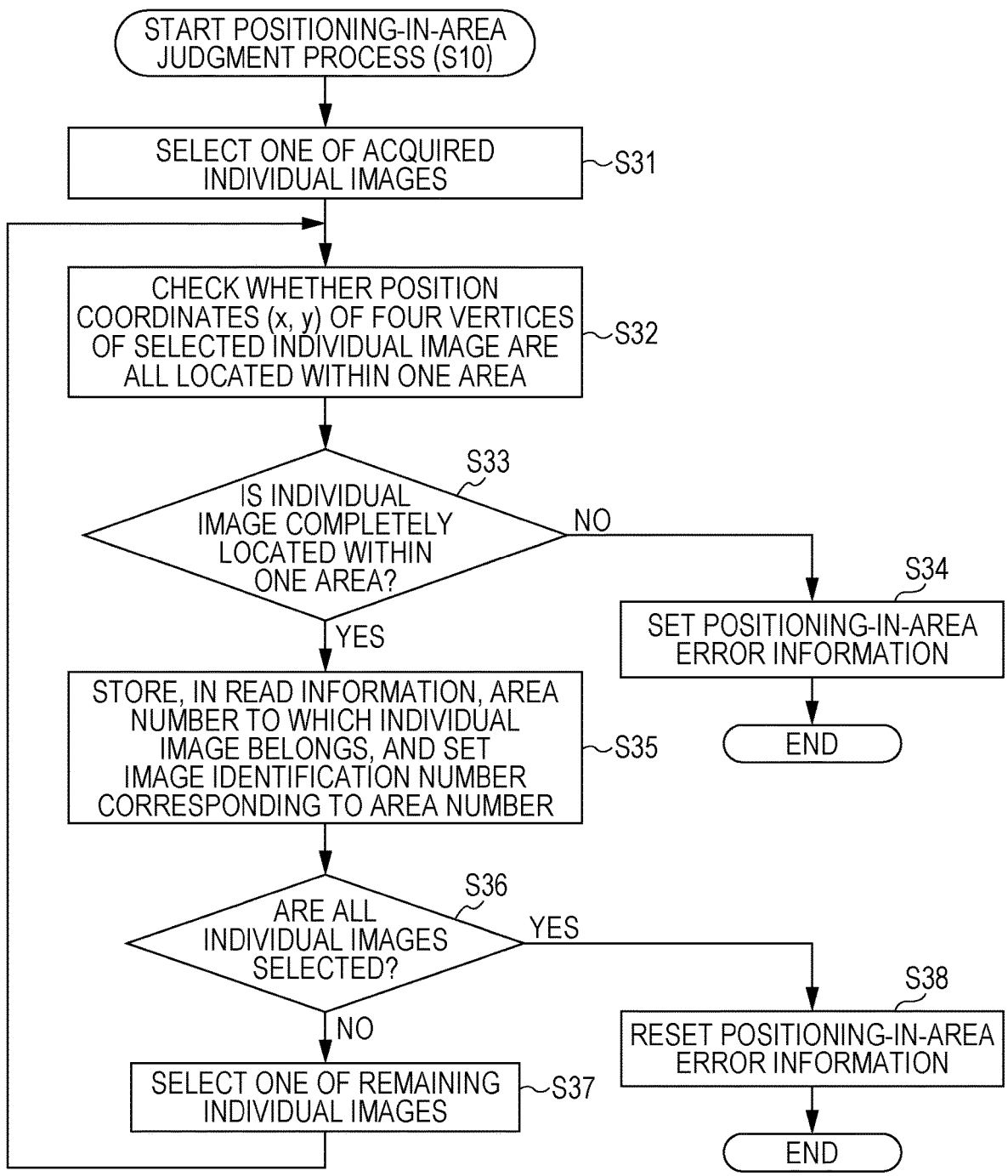
FIG. 12 is a flow chart illustrating an example of a process of determining whether a document is correctly positioned within an area, performed by an image processing apparatus according to an embodiment of the present disclosure.

FIG. 12 is a flow chart illustrating an example of a document positioning-in-area judgment process performed by the image processing apparatus according to an embodiment of the present disclosure. In this judgment on whether the document is positioned within an area, it is checked whether each individual image is completely located within one of the defined divided areas. This process is performed in step S10 shown in FIG. 11. In a case where an individual image is located within one divided area, it is determined that no positioning error occurs in the positioning-in-area judgment. In a case where the location of an individual image is not completely included in one divided area, for example, in a case where the individual image is located over two divided areas, it is determined that a positioning error occurs in the positioning-in-area judgment.

When one or more individual images have been acquired in step S8 described above, then in step S31 in FIG. 12, in order to make the positioning-in-area judgment on each individual image one by one, one of the acquired individual images is selected. Document vertex position coordinates are read from the read information on the selected individual image.

In step S32, it is checked whether position coordinates of four vertices of the selected individual image are all located in one area. In this process, as described in FIGS. 6A and 6B, the position coordinates of the four vertices of the selected individual image are compared with the four vertex position coordinates of each area, and, if the position coordinates of the four vertices of the selected individual image are as shown in FIG. 6A for a particular area, it is determined that the individual image is located within this particular area. On the other hand, for example, in a case where the position coordinates of the four vertices of the selected individual image are as shown in FIG. 6B for a particular area, it is determined that the individual image is not completely included in one area.

In a case where the selected individual image is completely located within one area, the processing flow proceeds to step S35, but otherwise the processing flow proceeds to step S34. In step S34, because the individual image of interest is not completely included in one area, positioning-in-area error information is set so as to indicate that a positioning error occurs in one of documents place by the user, and the information is stored in the storage unit 50. Thereafter, the process is ended. In the processing flow described above, when a plurality of documents are placed, it one of the documents has a positioning error, a user is to re-place this document. Therefore, at the point of time at which a positioning error is detected for one of documents, it is determined that a positioning error has occurred without performing the positioning-in-area judgment on other remaining individual images. However, alternatively, after the position-in-area judgment is performed for all individual images, if a positioning error is detected in one or more documents, it may be determined that a position error has occurred.

In step S35, an area number assigned to an area, within which the selected individual image is determined to be located, is stored in the read information associated with the selected individual image. Furthermore, an image identification number corresponding to the area number is set. In the first-time reading, new image identification number is set for each individual image. When the second-time reading is performed, there are image identification numbers already assigned to the individual images, and thus the same image identification numbers are set.

In step S36, it is checked whether all acquired individual images have been selected. In a case where all acquired individual images have been selected, the processing flow proceeds to step S38, but otherwise the processing flow proceeds to step S37. In step S37, one of remaining individual images is selected, and the processing flow returns to step S32. In step S38, because all acquired individual images are located within one of the divided areas, information is set so as to indicate that there is no positioning error (the positioning-in-area error information is set so as to indicate no occurrence of positioning error), and the information is stored in the storage unit 50. Thereafter, the process is ended. The positioning-in-area error information indicating an occurrence of a positioning error and the positioning-in-area error information indicating no occurrence of a positioning error in FIG. 12 are used in step S11 in FIG. 11.

Figure 13:
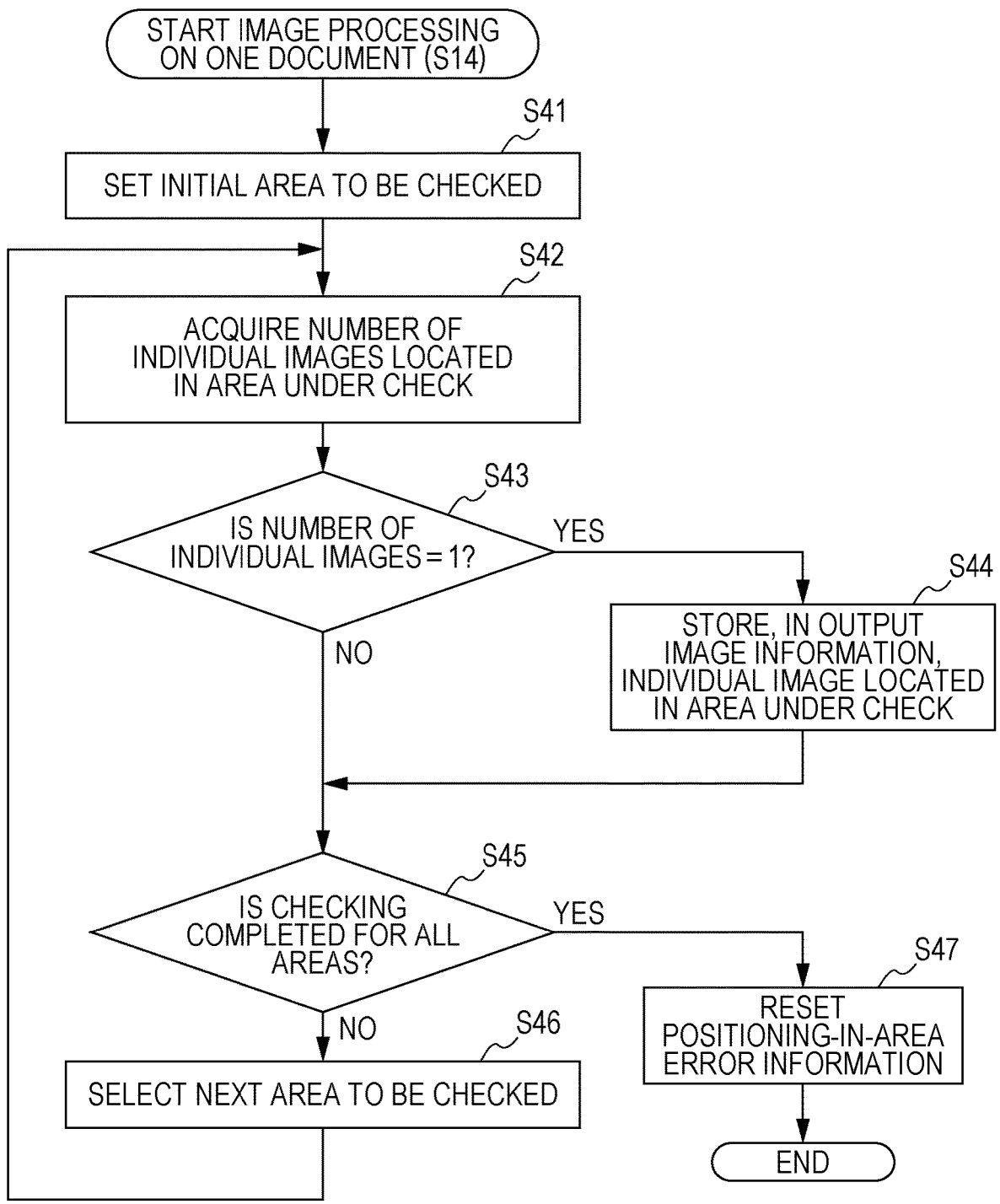
FIG. 13 is a flow chart illustrating an example of an image processing performed according to an embodiment for a case where only one individual image is included in one same area.

First Example of Image Processing Performed According to an Embodiment for a Case where Only One Individual Image Exists in One Same Area FIG. 13 is a flow, chart illustrating an example of image processing performed according to an embodiment for a case where only one individual image exists in one same area. This image processing is a process performed in step S14 shown in FIG. 11. In this process, it is checked whether the number of individual images included in a divided area is one, and, if this divided area includes only one individual image, then this one individual image is stored as read information on the document to be output regardless of the size and the location of the individual image.

In step S41 in FIG. 13, an initial setting is performed to select an area to be subjected to the checking from the set divided area. That is, one divided area to be subjected to checking on the number of individual images is selected. In step S42, the number of individual images located within the area being checked is acquired. In the read information 55 that has been already stored, each individual image has been assigned an area number, and thus it is possible to determine the number of individual images located in the area of interest by counting the number of individual images assigned the area number equal to the area number of the divided area of interest.

In a case where it is determined in step S43 that the acquired number of individual images is equal to 1, the processing flow proceeds to step S44, but otherwise the processing flow proceeds to step S45. On the other hand, in a case where the acquired number of individual images is not equal to 1, nothing is performed but a next divided area is checked.

In step S44, because, in this case, the area being checked includes only one individual image, the individual image included in this area being checked is stored in the output image information 56. In step S45, it is checked whether the checking is completed for all divided areas. In a case where the checking is completed for all divided areas, the processing in proceeds to step S47, but otherwise the processing flow proceeds to step S46. In step S46, an area to be checked next is selected from the remaining divided areas. Thereafter, the processing flow returns to step S42.

In step S47, because the checking has been already completed on all divided areas, information is set to indicate that there is no positioning error (the positioning-in-area error information is set so as to indicate no occurrence of a positioning error) as a result of the process in step S14 and the information is stored in the storage unit 50. Thereafter, the process is ended. In the processing flow shown in FIG. 13, in a case where an area being checked includes only one individual image, individual image information is stored in the output image information 56, but any processing is not performed in any other cases, and thus the positioning-in-area error information is not reset to indicate an occurrence of a positioning error but the positioning-in-area error information is set to indicate no occurrence of a positioning error and stored.

Figure 14:
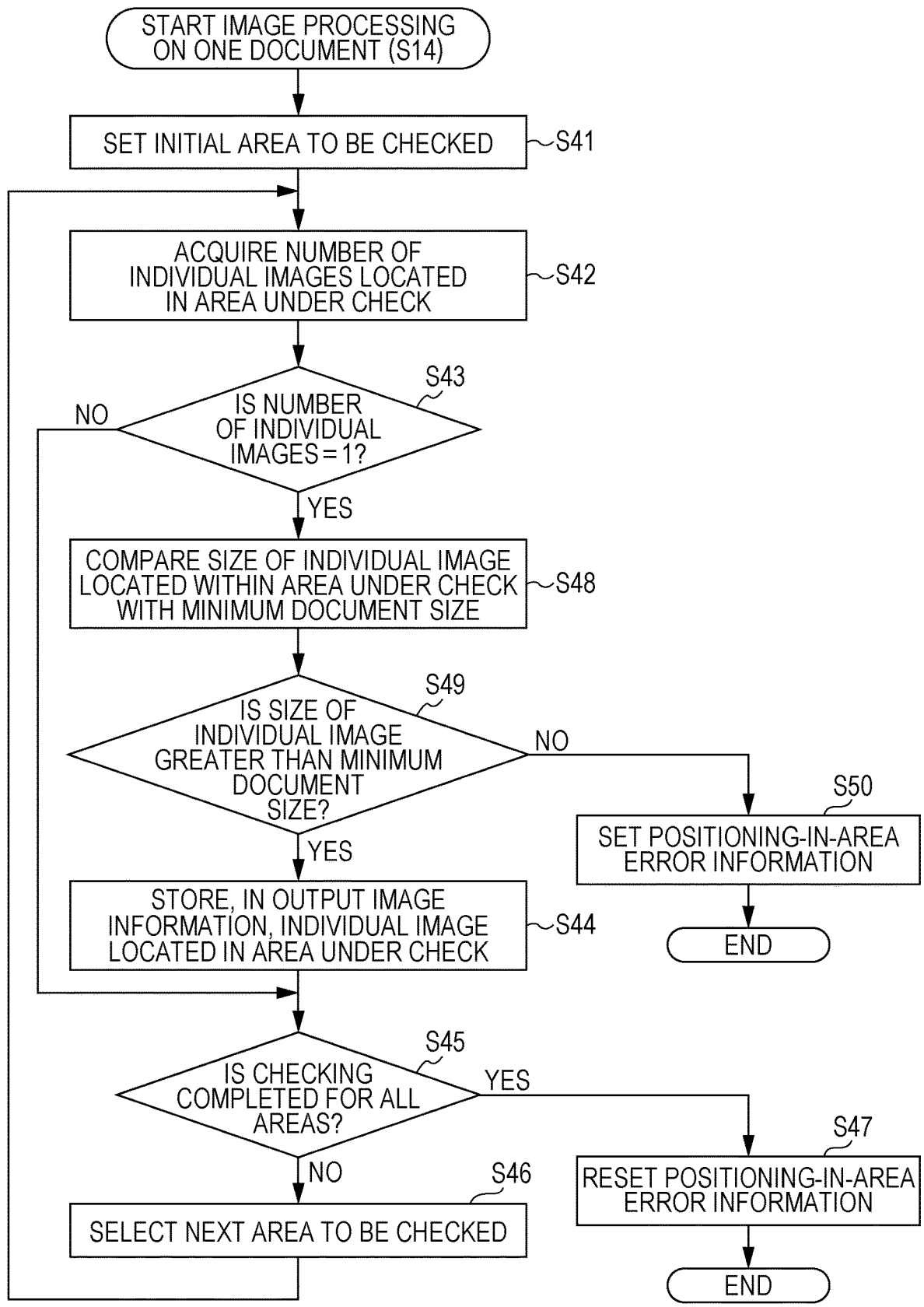
FIG. 14 is a flow chart illustrating an example of an image processing performed according to an embodiment for a case where only one individual image is included in one same area.

Second Example of Image Processing Performed According to an Embodiment for a Case where Only One Individual Image Exists in One Same Area FIG. 14 is a flow chart illustrating an example of image processing performed according to an embodiment for a case where only one individual image is included in one same area. This image processing is also performed in step S14 shown in FIG. 11. In step S14, either one of the process shown in FIG. 13 or the process shown in FIG. 14 is performed. Setting may be performed in advance to determine which one of the processes is to be performed, or a user may be allowed to select, in advance, which one of the processes is to be performed.

In the process shown in FIG. 14, it is checked whether a divided area includes only one individual image. If the area being checked included only one individual image, it is further checked whether the size of the individual image is greater than a minimum document size. When the size of the individual image is greater than the minimum document size, this individual image is stored as read information of a document whose individual image is to be output. On the other hand, when the size of the individual image is smaller than or equal to the minimum document size, information is set so as to indicate an occurrence of a positioning error and the information is stored. In FIG. 14, steps in which similar processes to those in FIG. 13 are performed are denoted by similar step numbers.

First, as in the process shown in FIG. 13, step S41 to step S43 are executed. That one area to be checked first is initially set, and the number of individual images included in this area being checked is acquired. In a case where it is determined in step S43 that the acquired number of individual images is equal to 1, the processing flow proceeds to step S48, but otherwise the processing flow proceeds to step S45.

In step S48, the individual image included in the area being checked is compared with the minimum document size information 54 set in advance in the storage unit, and it is checked whether the size of the individual image is greater than the size set in the minimum document size information 54.

More specifically, for example, the horizontal length and the vertical length described in the read information on the individual image are compared with the longitudinal length and the lateral length set in the minimum document size information 54 shown in FIGS. 9B and 9C. In a case where the horizontal length and the vertical length are respectively greater than the longitudinal length and the lateral length set in the minimum document size information 54, it is determined that the size of the individual image is greater than the size set in the minimum document size information 54. On the other hand, in a case where either one of the horizontal length and the vertical length is smaller than or equal to the longitudinal length or the lateral length set in the minimum document size information 54, it is determined that the size of the individual image is smaller than or equal to the size set in the minimum document size information 54. Alternatively, in a case where the area size of the individual image is greater than an area size of the minimum document area defined in the minimum document size information 54 as shown in FIG. 5D, it may be determined that the size of the individual image may be greater than the size set in the minimum document size information 54.

In a case where it is determined in step S49 that the size or the individual image is greater than the size set in the minimum document size information 54, the processing flow proceeds to step S44, but otherwise the processing flow proceeds to step S50. In step S50, because the individual image included in the area being checked is smaller than or equal to the size set in the minimum document size information 54, it is determined that there is a possibility that a reading error or the like has occurred, and information (the positioning-in-area error information) is set so as to indicate an occurrence of a positioning error as a result of the process in step S14, and the set information is stored in the storage unit 50. Thereafter, the process is ended.

In step S44, because the size of one individual image included in the area being checked is greater than the minimum document size, this individual image included in the area being checked is stored in the output image information 56.

Thereafter, as in the process shown in FIG. 13, the process in step S45 to step S47 is executed. That is, it is checked whether the checking is completed for all divided areas. In a case where the checking is completed for all divided areas, the processing flow proceeds to step S47 in which information (the positioning-in-area error information) is set to indicate that there is no positioning error) as a result of the process in step S14. The information is stored in the storage unit 50, and the process is ended. On the other hand, in a case where the checking is not completed for all divided areas, the processing flow proceeds to step S46, in which an area to be checked next is selected from the remaining divided areas. Thereafter, the processing flow returns to step S42. The positioning-in-area error information indicating an occurrence of a positioning error and the positioning-in-area error information indicating no occurrence of a positioning error in FIG. 13 and FIG. 14 are used in step S16 in FIG. 11.

Figure 15:
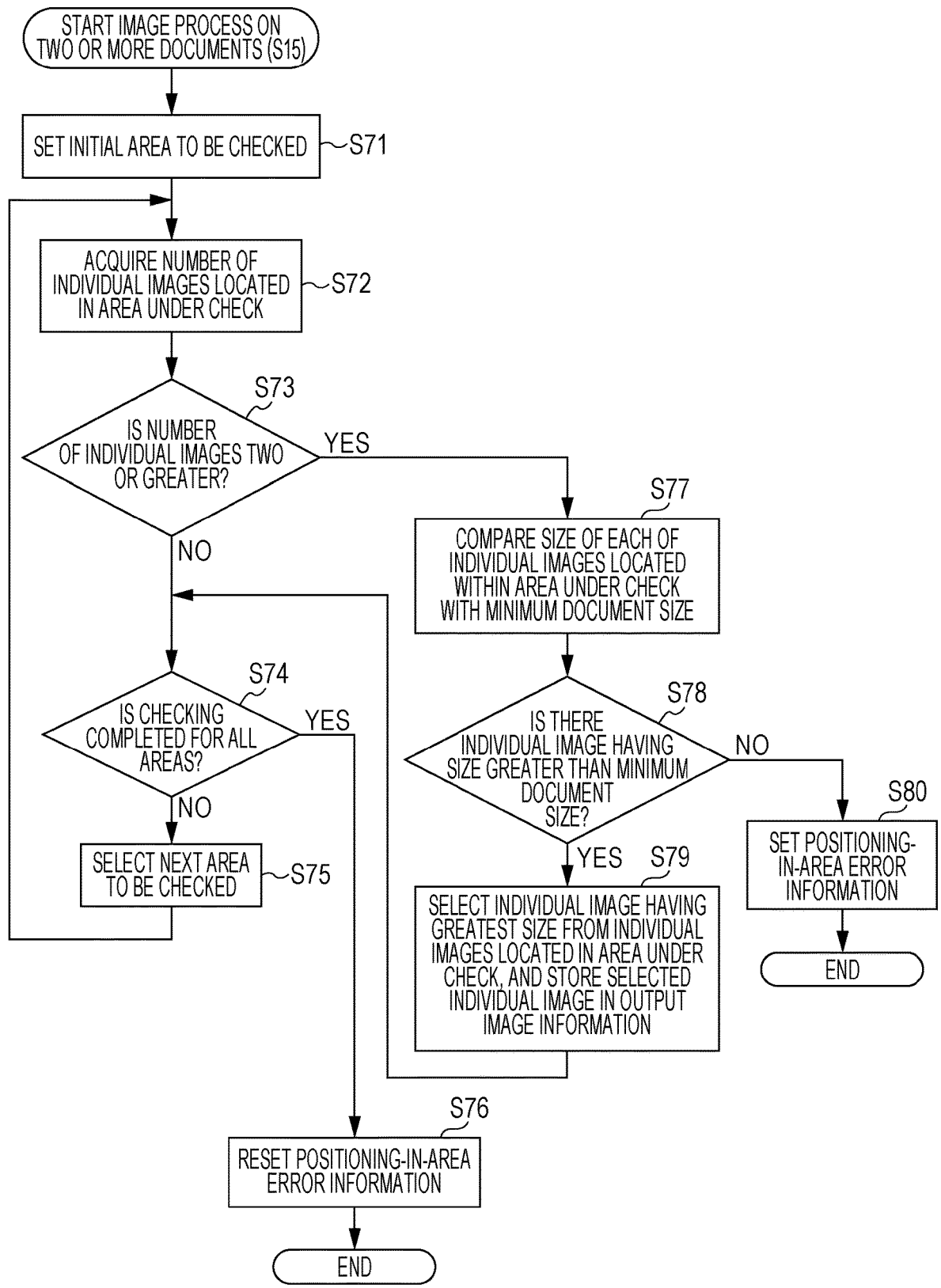
FIG. 15 is a flow chart illustrating an example of an image processing performed for a case where two or more individual images are included in one same area.

First Example of Image Processing Performed According to an Embodiment for a Case where Two or More Individual Images Exist in Same One Area FIG. 15 is a flow chart illustrating a first example of an image processing performed according to an embodiment for a case where two or more individual images exist in same one area. This image process is a process performed in step S15 shown in FIG. 11. In this process shown in FIG. 15, it is checked whether a divided area includes two or more individual images. If this divided area includes two or more individual images, the size of each individual image is checked. An individual image whose size is greater than the minimum document size and is the greatest among all individual images existing in the area of interest is selected, and this selected individual image is stored as read information of a document to be output. This corresponds to the process using the selection criterion described above with reference to FIG. 7A.

In step S71 in FIG. 15, an initial setting is performed to select an area to be subjected to the checking from the set divided area. That is, one divided area to be subjected to checking on the number of individual images is selected. In step S72, the number of individual images located within the area being checked is acquired. In the read information 55 that has been already stored, each individual image has been assigned an area number, and thus it is possible to determine the number of individual images located in the area of interest by counting the number of individual images assigned the area number equal to the area number of the divided area of interest.

In a case where it is determined in step S73 that the acquired number of individual images is equal to 2 or larger, the processing flow proceeds to step S77 but otherwise the processing flow proceeds to step S74. In step S77, because, in this case, the area being checked includes a plurality of individual images, each individual image included in the area being checked is compared with the size set in the minimum document size information 54, and it is checked whether the size of each individual image is greater than the size set in the minimum document size information 54.

In the comparison process, the determination is made in a similar manner as in step S48 in FIG. 14 described above. That is, for example, in a case where the horizontal length and the vertical length described in the read information on the individual image are respectively greater than the longitudinal length and the lateral length set in the minimum document size information 54 shown in FIGS. 9B and 9C, it is determined that the size of the individual image is greater than the size set in the minimum document size information 54. Alternatively, in a case where the area size of the individual image is greater than an area size of the minimum document area defined in the minimum document size information 54 as shown in FIG. 5D, it may be determined that the size of the individual image may be greater than the size set in the minimum document size information 54.

In a case where it is determined in step S78 that there is an individual image greater than the minimum document size, the processing flow proceeds to step S79. However, in a case where there is no individual image greater than the minimum document size, the processing flow proceeds to step S80. In step S80, because any individual image included in the area being checked is smaller than or equal to the size set in the minimum document size information 54, it is determined that there is a possibility that a reading error or the like has occurred, and information (the positioning-in-area error information) is set so as to indicate an occurrence of a positioning error as a result of the process in step S15 and the information is stored in the storage unit 50. Thereafter, the process is ended.

In step S79, an individual image having a greatest size is selected from the individual images located in the area being checked, and the selected individual image is stored in the output image information 56. Thus, as an image to be captured of the area being checked, only one individual image greater than the minimum document size and having the greatest size is selected from the plurality of individual images existing in the area being checked. Thereafter, the processing flow proceeds to step S74.

In step S74, it is checked whether the checking is completed for all divided areas. In a case where the checking is completed for all divided areas, the processing flow proceeds to step S76, but otherwise the processing flow proceeds to step S75. In step S75, an area to be checked next is selected from the remaining divided areas. Thereafter, the processing flow returns to step S72.

In step S76, because the checking has been already completed on all divided areas, information (the positioning-in-area error information) is set so as to indicate that there is no positioning error as a result of the process in step S15, and the information is stored in the storage unit 50. Thereafter, the process is ended. In the process in FIG. 15, if there is even only one area being checked in which there is no individual image with a size greater than the minimum document size, a positioning error occurs. In a case where there is an individual image greater than the minimum document size in each of all areas being checked, individual image information is stored in the output image information 56, and no positioning error occurs. That is, information is set so as to indicate that there is no positioning error and the set information is stored. The positioning-in-area error information indicating an occurrence of a positioning error and the positioning-in-area error information indicating no occurrence of a positioning error in FIG. 15 are used in step S16 in FIG. 11.

Figure 16:
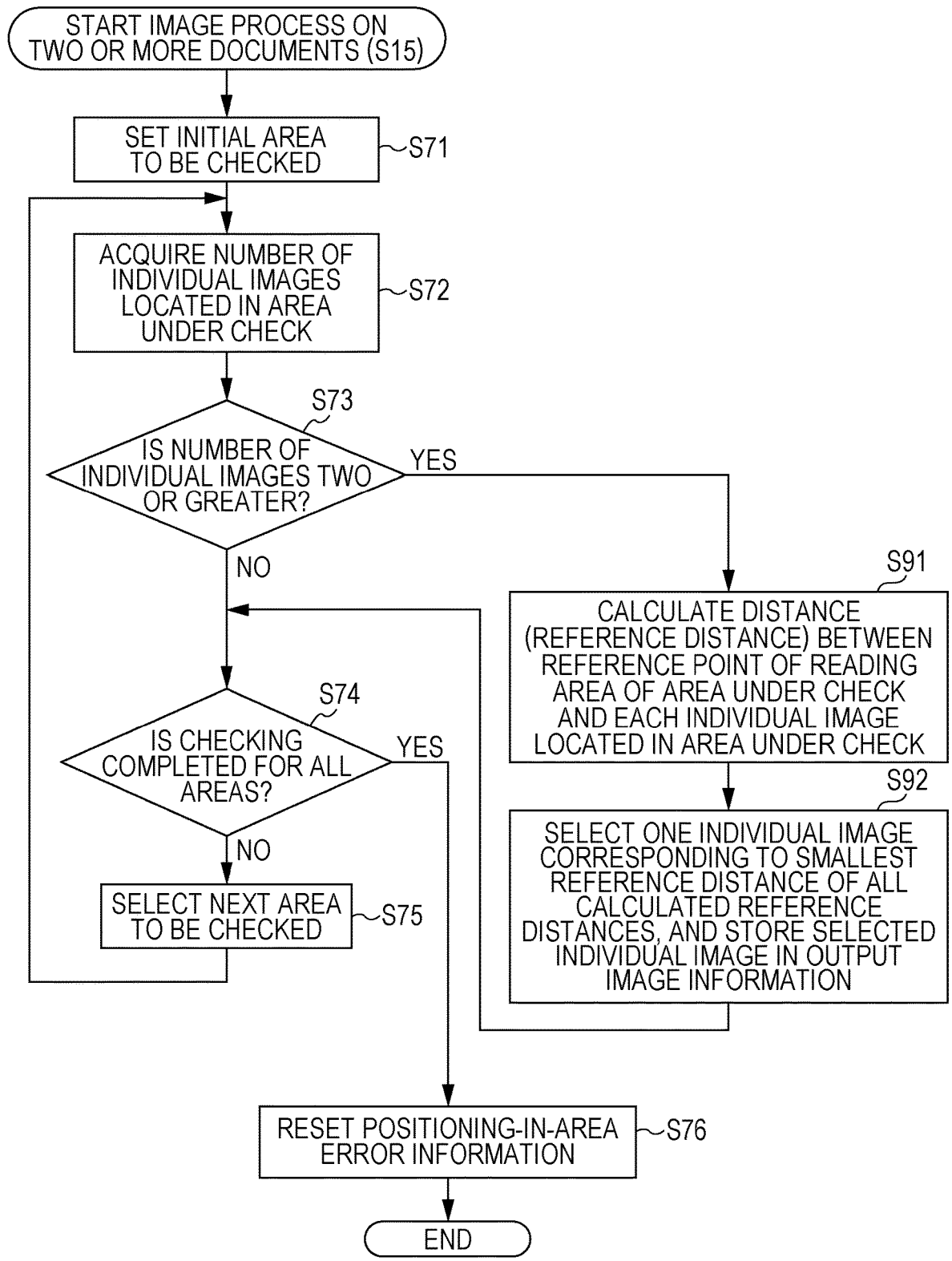
FIG. 16 is a flow chart illustrating an example of an image processing performed for a case where two or more individual images are included in one same area.

Second Example of Image Processing Performed According to an Embodiment for a Case where Two or More Individual Images Exist in One Same Area FIG. 16 is a flow chart illustrating an example of an image processing performed according to an embodiment for a case where two or more individual images exist in one same area. This image processing is also a process performed in step S15 shown in FIG. 11. In step S15, either one of the process shown in FIG. 15, the process shown in FIG. 16, and a process which will be described below with reference to FIG. 17 is performed. Setting may be made in advance so as to specify which process is to be performed, or a user may be allowed to select in advance which process is to be performed.

In the process, it is checked whether two or more individual images exist in a divided area. In a case where two or more individual images exist in this divided area, the locations of the respective individual images are checked, and an individual image existing at a location closest to the reference point of the area being checked is stored as read information of a document to be output. This process corresponds to a process using the selection criterion described above with reference to FIG. 7C. In FIG. 16, steps in which similar processes to steps in FIG. 15 are performed are denoted by similar step numbers.

First, step S71 to step S73 are performed in a similar manner as in FIG. 15. That is, one area to be checked first is initially set, and the number of individual images included in this area being checked is acquired. In a case where it is determined in step S73 that the acquired number of individual images is equal to 2 or larger, the processing flow proceeds to step S91, but otherwise the processing flow proceeds to step S74.

In step S91, because, in this case, the area being checked includes a plurality of individual images, the distance (the reference distance) of each individual image in the area being checked from the reference point of the reading area of the area being checked is calculated. The reference distance indicates a shortest distance between the reference point and each individual image as shown in FIG. 7C. In step S92, one individual image corresponding to the smallest reference distance of all calculated reference distances is selected and stored in the output image information 56. As a result, only one individual image existing at a location closest to the reference point of the reading area of the area being checked is selected from a plurality of individual images existing in the area being checked, and the selected individual image is employed as the image to be captured in the area being checked. Thereafter, the processing flow proceeds to step S74.

Step S74 to step S76 are similar to those in FIG. 15. That is, it is checked whether the checking is completed for all divided areas. In a case where the checking is completed for all divided areas, the processing flow proceeds to step S76, but otherwise the processing flow proceeds to step S75. In step S75, an area to be checked next is selected from the remaining divided areas. Thereafter, the processing flow returns to step S72.

In step S76, because the checking has been already completed for all divided areas, information (the positioning-in-area error information) is set so as to indicate that there is no positioning error as a result of the process in step S15. The information is stored in the storage unit 50. Thereafter, the process is ended. In the process in FIG. 16, if a plurality of individual images exist in an area being checked, one individual image located closest to the reference point is selected, and individual image information is stored in the output image information 56. However any processing is not performed in any other cases, the positioning-in-area error information is not set so as to indicate an occurrence of positioning error, and the positioning-in-area error information is set so as to indicate no occurrence of positioning error. The positioning-in-area error information indicting no occurrence of a positioning error in FIG. 16 is used in step S16 in FIG. 11.

Third Example of Image Processing Performed According to an Embodiment for a Case where Two or More Individual Images Exist in One Same Area FIG. 17 is a flow chart illustrating an example of an image processing performed according to an embodiment for a case where two or more individual images exist in one same area. This image processing is also a process performed in step S15 shown in FIG. 11.

In this process, it is checked whether a divided area includes two or more individual images. In a case where two or more individual images exist in this divided area, it is determined that the image capturing is not allowed without checking the individual image size or the like, and the positioning-in-area error information is set to indicate an occurrence of a positioning error. This process corresponds to a process of determining that the image capturing is not allowed described above with reference to FIG. 5C. In FIG. 17, steps in which similar processes to steps in FIG. 15 are performed are denoted by similar step numbers.

First, step S71 to step S73 are performed in a similar manner as in FIG. 15. That one area to be checked first is initially set, and the number of individual images included in this area being checked is acquired. In a case where it is determined in step S73 that the acquired number of individual images is equal to 2 or larger, the processing flow proceeds to step S80, but otherwise the processing flow proceeds to step S74.

In step S80, because in this case two or more individual images exist in one area being checked, it is determined that this placement does not meet the document positioning rule indicating that only one document is allowed to be placed in one area, and information (the positioning-in-area error information) is set so as to indicate an occurrence of a positioning error as a result of the process in step S15, and the set information is stored in the storage unit 50. Thereafter the process is ended.

Step S74 to step S76 are similar to those in FIG. 15. That is, it is checked whether the checking is completed for all divided areas. In a case where the checking is completed for all divided areas, the processing flow proceeds to step S76, but otherwise the processing flow proceeds to step S75. In step S75, an area to be checked next is selected from the remaining divided areas. Thereafter, the processing flow returns to step S72.

In step S76, because the checking has been already completed on all divided areas, information (the positioning-in-area error information) is set so as to indicate that there is no positioning error as a result of the process in step S15, and the set information is stored in the storage unit 50. Thereafter, the process is ended In the process in FIG. 17, if a plurality of individual images exist in one area being checked, a positioning error occurs. Any processing is not per in any other cases, and thus the positioning-in-area error information is not set so as to indicate an occurrence of a positioning error but the positioning-in-area error information is set to indicate no occurrence of a positioning error and stored. The positioning-in-area error information indicating an occurrence of a positioning error and the positioning-in-area error information indicating no occurrence of a positioning error in FIG. 17 are used in step S16 in FIG. 11.

The present disclosure contains subject matter related to that disclosed in Japanese Priority Patent Application JP 2017-212782 filed in the Japan Patent Office on Nov. 2, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a platen on which a document to be read is placed;
an image scanner configured to read, at a time, one or a plurality of documents placed on the platen;
a memory that stores instructions to be executed; and
a processor that executes the instructions stored in the memory to:
extract individual images of the one or the plurality of documents read at a time;

determine whether the extracted individual images are each located within one of areas set in a reading area of the platen depending on a number of documents to be read;

in a case where one of the extracted individual images is located within a particular area, select the one of the extracted individual images as an image to be captured in the particular area; and in a case where one of the extracted individual images is located across two adjacent areas, treating the one of the extracted individual images as an error.

2. The image processing apparatus according to claim 1, wherein in a case where a plurality of extracted individual images are located within a particular one area, the processor executes an instruction not to perform the individual image selection.

3. The processing apparatus according to claim 1, wherein in a case where a plurality of extracted individual images are located within a particular one area, the processor further executes an instruction to select an individual image having a greatest size of the plurality of individual images as an image to be captured in the particular area.

4. The image processing apparatus according to claim 1, wherein in a case where a plurality of extracted individual images are located within a particular one area, the processor further executes an instruction to select, as an image to be captured in the particular one area, an individual image of a document which is greater than a predetermined minimum document size information and which is greatest of the plurality of individual images located within the particular one area.

5. The image processing apparatus according to claim 1, wherein
in a case where a plurality of extracted individual images are located within a particular one area,
the processor further executes an instruction to select, from the plurality of individual images located within the particular area, an individual image of a document placed at a location closest to a reference point of the particular area among the plurality of individual images located within the particular area.

6. The image processing apparatus according to claim 1, the processor further executes an instruction to set a number of areas in the reading area of the platen such that the number of areas corresponds to the number of documents to be read at a time, and to set locations of the areas.

7. The image processing apparatus according to claim 1, wherein the processor further executes instructions to:
read a particular first side of reading sides of each document of the plurality of documents placed by a user on the platen such that one document is located within one of areas set in the reading area of the platen without overlapping between documents, and then read, using the image scanner, the first side of each of the plurality of documents;
thereafter, re-place the plurality of documents such that each document is turned over and placed in the same area as the area in which the document is located when the first side of the document is read, and then read, using the image scanner, a second side of each document different from the first side; and
extract, from the read images of the plurality of documents, an individual image of the first side of each of the plurality of documents and an individual image of the second side of each of the plurality of documents, and associate, each individual image of a first side of a document placed in a particular area of the platen and a corresponding individual image of a second side of a document placed in the same particular area thereby obtain image information of a front side and a back side of one document.

8. The image processing apparatus according to claim 7, the processor further executes instructions to:
combine the individual image of the first side and the individual image of the second side associated with the individual image of the first side into one piece of image information and,
output the resultant one piece of image information.

9. An image processing method for an image processing apparatus, comprising:
to read a particular first side of a plurality of reading sides of each document of a plurality of documents, placing the plurality of documents on a platen such that one document is located within one of areas set in a reading area of the platen without overlapping between documents, and then performing a first-time reading process to read image data including the first side of each of the plurality of documents;
thereafter, re-placing the plurality of documents such that each document is turned over and placed in the same area as the area in which the document is located when the first side of the document is read, and then performing a second-time reading process to read image data including a second side of each document different from the first side;
extracting individual images of the first sides of respective documents from the image data obtained in the first-time reading process;
extracting individual images of the second sides of the respective documents from the image data obtained in the second-time reading process;
determining whether each extracted individual image of the first side and each extracted individual image of the second side are located within one of areas set in the reading area of the platen;
in a case where one of extracted individual images is located within a particular area, selecting, as an image to be captured in the area, the one of the extracted individual images of the first side corresponding to one document and the one of the extracted individual images of the second side corresponding to the same document;
associating the individual image of the first side and the individual image of the second side of the document selected in the area thereby obtaining image information of a front side and a back side of the one document, and outputting the image information of the front side and the back side associated with each other of the document for each of the plurality of read documents; and
in a case where one of the extracted individual images is located across two adjacent areas, treating the one of the extracted individual images as an error.

* * * * *